US009451503B2

(12) United States Patent
Ishida et al.

(10) Patent No.: US 9,451,503 B2
(45) Date of Patent: Sep. 20, 2016

(54) MOBILE TERMINAL AND METHOD FOR CONTROLLING RATE CHANGE

(75) Inventors: Chie Ishida, Kanagawa (JP); Ichiro Takei, Tokyo (JP); Yasuharu Hashimoto, Fukuoka (JP); Naohiro Kawabata, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 147 days.

(21) Appl. No.: 14/131,881

(22) PCT Filed: Aug. 14, 2012

(86) PCT No.: PCT/JP2012/005156
§ 371 (c)(1),
(2), (4) Date: Mar. 31, 2014

(87) PCT Pub. No.: WO2013/031114
PCT Pub. Date: Mar. 7, 2013

(65) Prior Publication Data
US 2014/0219119 A1     Aug. 7, 2014

(30) Foreign Application Priority Data

Aug. 31, 2011  (JP) .................................. 2011-189877
Aug. 31, 2011  (JP) .................................. 2011-189878

(51) Int. Cl.
*H04W 36/00* (2009.01)
*H04W 24/10* (2009.01)
*H04W 36/14* (2009.01)

(52) U.S. Cl.
CPC ......... *H04W 36/0005* (2013.01); *H04W 24/10* (2013.01); *H04W 36/0083* (2013.01); *H04W 36/14* (2013.01)

(58) Field of Classification Search
CPC  H04W 36/0005; H04W 24/10; H04W 36/30
See application file for complete search history.

(56) References Cited

U.S. PATENT DOCUMENTS 5,697,055 A * 12/1997 Gilhousen ......... H04W 36/0055
                                                          370/332
6,240,287 B1 *  5/2001 Cheng .................. H04W 48/06
                                                          370/342

(Continued)

FOREIGN PATENT DOCUMENTS

JP     2004-153618 A    5/2004
JP     2007-142590 A    6/2007

(Continued)

OTHER PUBLICATIONS

International Search Report for Application No. PCT/JP2012/005156 dated Nov. 13, 2012.

(Continued)

*Primary Examiner* — Candal Elpenord
(74) *Attorney, Agent, or Firm* — Pearne & Gordon LLP

(57) ABSTRACT

A mobile terminal which can be connected to a plurality of base stations with different mobile communication systems, includes a handover determination section that determines a handover execution between cells provided by the plurality of base stations, a transmission rate control section that changes a transmission rate before a handover when the handover execution is determined, and a report creation section that creates a measurement report including information regarding the handover after the transmission rate is changed, and transmits the measurement report to a base station of a cell to which the mobile terminal is currently connected.

20 Claims, 19 Drawing Sheets

(56) References Cited

U.S. PATENT DOCUMENTS

| | | | |
|---|---|---|---|
| 8,259,677 B2* | 9/2012 | Olsson | H04W 36/02 370/328 |
| 8,792,365 B2* | 7/2014 | Chin | H04W 36/0066 370/252 |
| 2005/0059401 A1* | 3/2005 | Chen | H04W 36/0072 455/437 |
| 2006/0159045 A1* | 7/2006 | Ananthaiyer | H04W 28/22 370/329 |
| 2007/0123265 A1* | 5/2007 | Moon | H04W 36/04 455/449 |
| 2008/0119183 A1 | 5/2008 | Kono | |
| 2008/0130584 A1* | 6/2008 | Pani | H04W 36/0083 370/332 |
| 2009/0046656 A1* | 2/2009 | Kitazoe | H04W 36/0055 370/331 |
| 2010/0130241 A1* | 5/2010 | Kitaji | H04W 28/18 455/509 |
| 2011/0035639 A1* | 2/2011 | Earnshaw | H04L 1/1812 714/748 |
| 2012/0220302 A1* | 8/2012 | Ebara | H04W 64/006 455/437 |

FOREIGN PATENT DOCUMENTS

| | | |
|---|---|---|
| JP | 2007-274016 A | 10/2007 |
| JP | 2011-103510 A | 5/2011 |
| WO | 2006/011452 A1 | 2/2006 |
| WO | 2008/069075 A1 | 6/2008 |
| WO | 2011/058820 A1 | 5/2011 |

OTHER PUBLICATIONS

Susumu Ishihara, Daisuke Tamura, Goh Miyamoto. "Effect of predictive rate control of video streaming on handovers in wireless LAN," Institute of Electronics, Information and Communication Engineers Technical Report IN2005-172, Mar. 2006.

* cited by examiner

*FIG. 5*

```
-- ASN1 START

MEASRESULTS ::=           SEQUENCE {
    MEASID                    MEASID
    MEASRESULTPCELL           SEQUENCE {
        RSRPRESULT                RSRP-RANGE
        RSRQRESULT                RSRQ-RANGE
    },
    MEASRESULTNEIGHCELLS      CHOICE {
        MEASRESULTLISTEUTRA       MEASRESULTLISTEUTRA,
        MEASRESULTLISTUTRA        MEASRESULTLISTUTRA,
        MEASRESULTLISTGERAN       MEASRESULTLISTGERAN,
        MEASRESULTSCDMA2000       MEASRESULTSCDMA2000.
        ...
    }
    HANDOVERREQUEST           BOOLEAN                              OPTIONAL.
    ...
    [[ MEASRESULTFORECID-R9      MEASRESULTFORECID-R9              OPTIONAL
    ]]
    [[ LOCATIONINFER10           LOCATIONINFER10                   OPTIONAL
       MEASRESULTSERVFREQLIST-R10 MEASRESULTSERVFREQLIST-R10       OPTIONAL
    ]]
}
(OMITTED)

-- ASN1 STOP
```

*FIG. 6*

```
--ASN1 START
MEASRESULTS ::=                         SEQUENCE{
    MEASID                                  MEASID
    MEASRESULTSERVCELL                      SEQUENCE{
        RSRPRESULT                              RSRP-RANGE
        RSRQRESULT                              RSRQ-RANGE
    },
    MEASRESULTNEIGHCELLS                    CHOICE{
        MEASRESULTLISTEUTRA                     MEASRESULTLISTEUTRA,
        MEASRESULTLISTUTRA                      MEASRESULTLISTUTRA,
        MEASRESULTLISTGERAN                     MEASRESULTLISTGERAN,
        MEASRESULTSCDMA2000                     MEASRESULTSCDMA2000,
        ...
    }                                                                   OPTIONAL
    ...,
    [[ MEASRESULTFORECID-R9                 MEASRESULTFORECID-R9        OPTIONAL
    ]],
}
MEASRESULTLISTEUTRA::=                  SEQUENCE(SIZE(1..MAXCELLREPORT)) OF MEASRESULTEUTRA
MEASRESULTLIEUTRA::=SEQUENCE{
    PHYSCELLID                              PHYSCELLID
    CGI-INFO                                SEQUENCE{
        CELLGLOBALID                            CELLGLOBALIDEUTRA,
        TRACKINGAREACODE                        TRACKINGAREACODE,
        PLMN-IDENTITYLIST                       PLMN-IDENTITYLIST2      OPTIONAL
    }                                                           OPTIONAL
    MEASRESULT                              SEQUENCE{
        RSRPRESULT                              RESP-RANGE              OPTIONAL
        RSRQRESULT                              RESQ-RANGE              OPTIONAL
        ...
        [[ ADDITIONALS-IINFO-R9                 ADDITIONALS-IINFO-R9    OPTIONAL
        ]],
    }
}

MEASRESULTLISTEUTRA::=                  SEQUENCE(SIZE(1..MAXCELLREPORT)) OF MEASRESULTEUTRA
MEASRESULTLIEUTRA::=SEQUENCE{
    PHYSCELLID                              CHOICE{
        FDD                                     PHYSCELLIDUTRA-FDD,
        TDD                                     PHYSCELLIDUTRA-TDD,
    },
    CGI-INFO                                SEQUENCE{
        CELLGLOBALID                            CELLGLOBALIDUTRA
        LOCATIONAREACODE                        BIT STRING(SIZE(16))    OPTIONAL,
        ROUTINGAREACODE                         BIT STRING(SIZE(8))     OPTIONAL,
        PLMN-IDENTITYLIST                       PLMN-IDENTITYLIST2      OPTIONAL
    }                                                           OPTIONAL,
    MEASRESULT                              SEQUENCE{
        UTRA-RSCP                               INTEGER(-5..91)         OPTIONAL,
        UTRA-ECNO                               INTEGER(0..49)          OPTIONAL,
        HANDOVERREQUEST                         BOOLEAN                 OPTIONAL,
        ...
        [[ ADDITIONALS-IINFO-R9                 ADDITIONALS-IINFO-R9    OPTIONAL
        ]],
    }
}
(PARAMETERS OF GERAN AND C2K ARE OMITTED)
-- ASN1 STOP
```

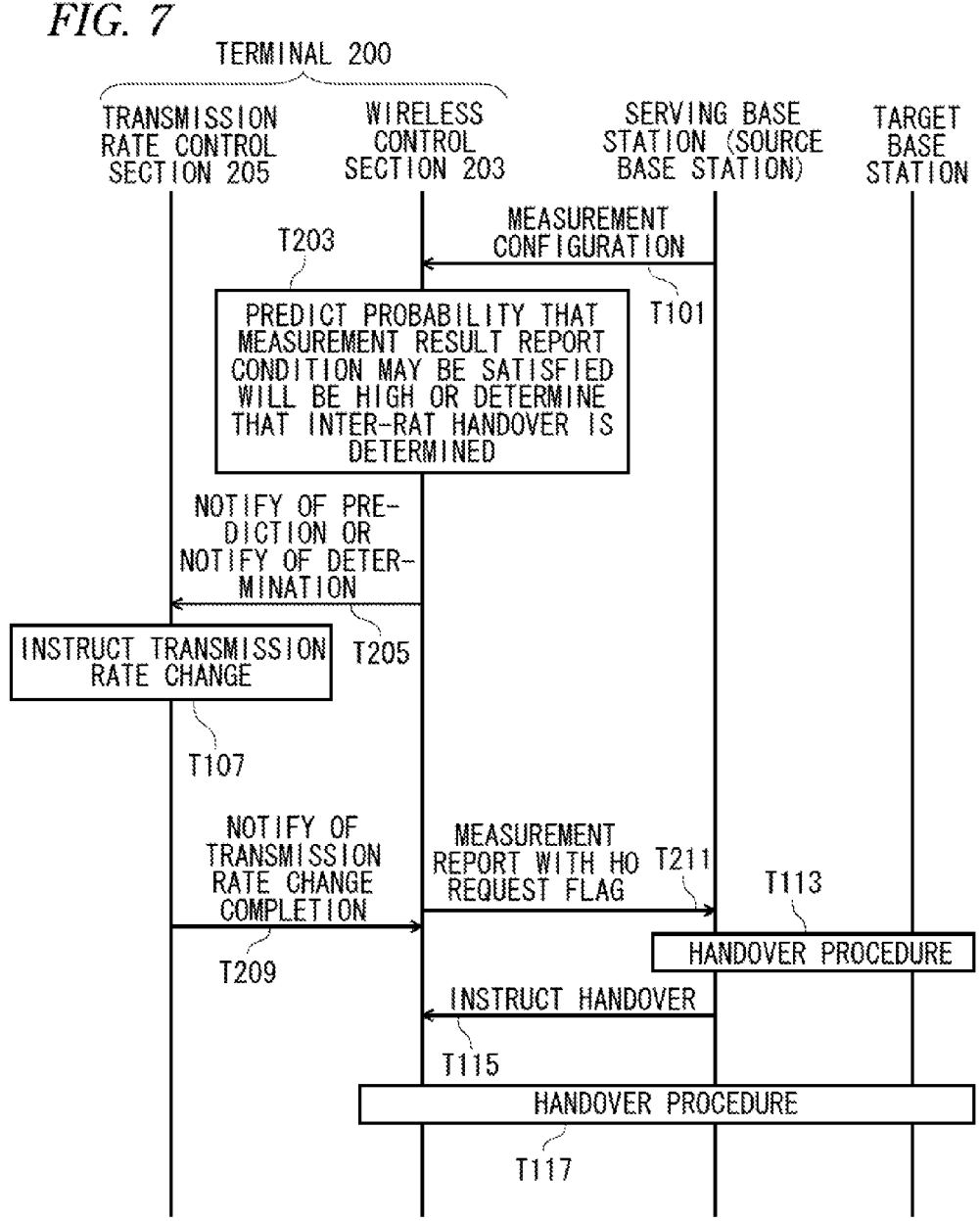

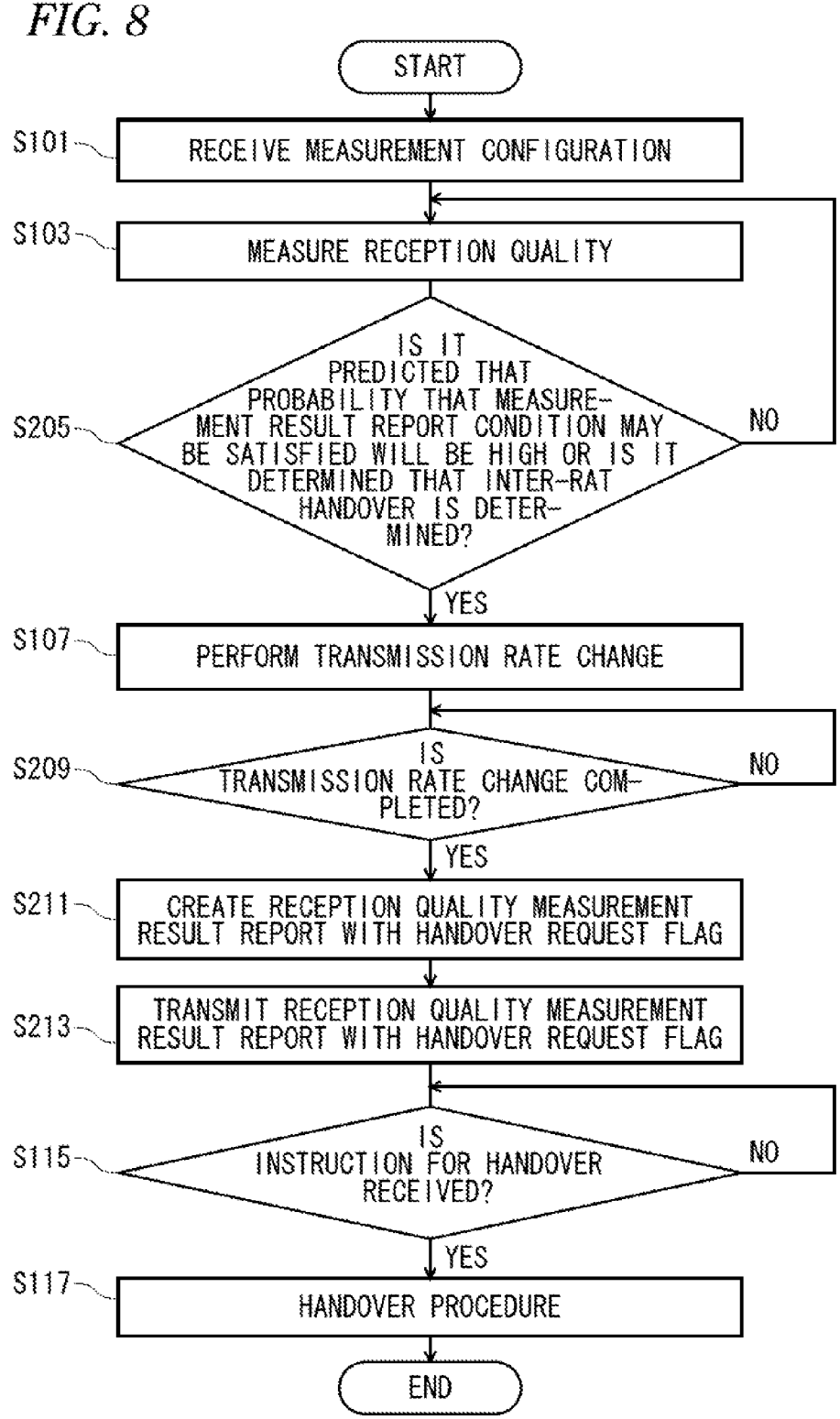

MOBILE TERMINAL AND METHOD FOR CONTROLLING RATE CHANGE

TECHNICAL FIELD

The present invention relates to a mobile terminal which can be connected to a plurality of base stations with different mobile communication systems and a method for controlling a rate change.

BACKGROUND ART

In recent years, in a cellular mobile communication system, a technique for realizing high transmission rate by using high frequency wireless communication bands has been vigorously examined in order to realize transmission of mass data with the advance of multimedia information. In the cellular mobile communication system, there are, for example, a Long Term Evolution (LTE) scheme, a Wideband Code Division Multiple Access (W-COMA) scheme or a cdma2000 scheme which is classified as 3rd Generation (3G), a Global System for Mobile Communication (GSM) (registered trademark) scheme which is classified as 2nd Generation (2G), and the like, and a plurality of mobile communication systems are mixed. In a case where a single wireless communication mobile terminal (hereinafter, simply referred to as "terminal") can be connected to a plurality of different mobile communication systems, a different-type network handover which is a handover between different types of mobile communication systems may occur. The different-type network handover is a handover or the like, for example, from an LTE network in which communication can be performed at a high transmission rate to a 3G network in which communication is performed at a transmission rate lower than that in the LTE network, and is called an Inter-RAT (Radio Access Technology) handover. In addition, an Intra-RAT handover refers to an identical-type network handover such as a handover, for example, from an LTE network to an LTE network.

FIG. 19 is a timing chart illustrating procedures when an Intra-RAT handover and an Inter-RAT handover occur. As illustrated in FIG. 19, a terminal receives a reception quality measurement configuration (Measurement Configuration) from a currently connected base station (hereinafter, referred to as a "serving base station"; however, also referred to as a "source base station" when the base station is a handover source). The reception quality measurement configuration indicates a condition for reporting a reception quality measurement result to the serving base station, content to be reported, a frequency of reports, or the like. The terminal measures reception quality of a serving cell and a neighbor cell while communicating with the serving base station. If a condition designated in the reception quality measurement configuration is satisfied, the terminal transmits a report (Measurement Report) regarding the reception quality measurement result to the serving base station.

When it is determined that a handover is performed based on the report (Measurement Report) sent from the terminal, the serving base station selects a base station (target base station) which is a handover destination, and performs a handover procedure with the target base station. Next, the serving base station which is a source base station sends a handover instruction to the terminal. The terminal performs a handover procedure with a base station (target base station) designated by the handover instruction in response to the handover instruction sent from the serving base station. When the handover procedure is completed, the terminal starts communication with the target base station.

CITATION LIST

Patent Literature

[PTL 1] JP-A-2004-153618
[PTL 2] JP-A-2007-142590

Non Patent Literature

[NPL 1] Susumu ISHIHARA, Daisuke TAMURA, Goh MIYAMOTO, "Effect of predictive rate control of video streaming on handovers in wireless LAN" Technical Report IN2005-172, March 2006

SUMMARY OF INVENTION

Technical Problem

If a terminal which currently transmits video data for a television telephone conference or the like performs a handover (Inter-RAT handover) from an LTE network in which communication can be performed at a high transmission rate to a 3G network in which communication is performed at a transmission rate lower than that in the LTE network, a transmission rate which can be used to transmit video data by the terminal is reduced from an LTE rate (for example, several Mbps) to a 3G rate (for example, 384 Kbps). However, a transmission rate in transmission and reception of the terminal remains the LTE rate, and thus video data which cannot be transmitted from the terminal, is stored in a transmission buffer, thereby causing buffer overflow. At this time, interruption or irregularity of videos occurs in a partner terminal.

An object of the present invention is to provide a mobile terminal and a method for controlling a rate change capable of performing stable data transmission when a handover is performed to a communication network of which a transmission rate which can be used to transmit data is lower than a current transmission rate.

Solution to Problem

According to one aspect of the invention, there is provided a mobile terminal which can be connected to a plurality of base stations with different mobile communication systems, comprising:
a handover determination section configured to determine a handover execution between cells provided by the plurality of base stations;
a transmission rate control section configured to change a transmission rate before a handover when the handover execution is determined; and
a report creation section configured to create a measurement report including information regarding the handover after the transmission rate is changed, and transmit the measurement report to a base station of a cell to which the mobile terminal is currently connected.

According to another aspect of the invention, there is provided a mobile terminal which can be connected to a plurality of base stations with different mobile communication systems, comprising:
a measurement section configured to measure respective pieces of reception quality of a cell to which the mobile terminal is currently connected and a neighbor cell;

a transmission rate control section configured to change a transmission rate before a handover when the measurement section measures reduced reception quality; and a report creation section configured to create a measurement report including information regarding the handover after the transmission rate is changed, and transmit the measurement report to a base station of the cell to which the mobile terminal is currently connected.

According to another aspect of the invention, there is provided a rate change control method performed by a mobile terminal which can be connected to a plurality of base stations with different mobile communication systems, comprising:

a handover determination step of determining a handover execution between cells provided by the plurality of base stations;

a rate change step of changing a transmission rate before a handover when the handover execution is determined; and a report step of creating a measurement report including information regarding the handover after the transmission rate is changed, and transmitting the measurement report to a base station of a cell to which the mobile terminal is currently connected.

According to another aspect of the invention, there is provided a rate change control method performed by a mobile terminal which can be connected to a plurality of base stations with different mobile communication systems, comprising:

a measurement step of measuring respective pieces of reception quality of a cell to which the mobile terminal is currently connected and a neighbor cell;

a rate change step of changing a transmission rate before a handover when a reduction in the reception quality is measured; and a report step of creating a measurement report including information regarding the handover after the transmission rate is changed, and transmitting the measurement report to the base station of the cell to which the mobile terminal is currently connected.

Advantageous Effects of Invention

According to the mobile terminal and the method for controlling a rate change related to the present invention, it is possible to perform stable data transmission when a handover is performed to a communication network of which a transmission rate which can be used to transmit data is lower than a current transmission rate.

BRIEF DESCRIPTION OF DRAWINGS

FIG. 5 is a diagram illustrating an example of a format of a reception quality measurement result report with a handover request flag.

FIG. 6 is a diagram illustrating another example of a format of a reception quality measurement result report with a handover request flag.

FIG. 7 is a sequence diagram illustrating an example of signaling between the terminal according to the second embodiment and a base station.

FIG. 8 is a flowchart illustrating an example of an operation of the terminal according to the second embodiment.

DESCRIPTION OF EMBODIMENTS

Hereinafter, embodiments of the present invention will be described with reference to the drawings. A mobile communication system according to the embodiments described below includes a wireless communication mobile terminal (hereinafter, simply referred to as a "terminal"), and a plurality of wireless communication apparatuses which can communicate with a wireless communication terminal via a wireless communication network. The terminal is, for example, a mobile phone. In addition, the wireless communication apparatus is a wireless communication base station (for example, E-UTRAN Node B: eNB in LTE, and Node B: NB in 3G) which communicates with the terminal in a wireless manner. However, the wireless communication apparatus may be an extended radio base station (Remote Radio Head: RRH) installed at a position separate from a wireless communication base station, a relay apparatus (a relay node or a repeater) which is wirelessly connected to a wireless communication base station or the like, a femto base station, a pico base station, or the like.

A mobile communication system described below is a system which can use two different networks including a network using a mobile communication technique of LTE standardized in the 3rd Generation Partnership Project (3GPP) and a network using a mobile communication technique of 3G such as the W-CDMA scheme or the cdma2000 scheme and 2G such as the GSM (registered trademark) scheme. In other words, the terminal can use both of the networks, and the wireless communication apparatus uses at least one network. For example, a transmission rate allocated to each terminal is assumed to be 1 to 2 Mbps in LTE and to be 384 Kbps in 3G. In this case, use of LTE with a higher transmission rate enables high image quality video communication.

(First embodiment)

Figure 1:
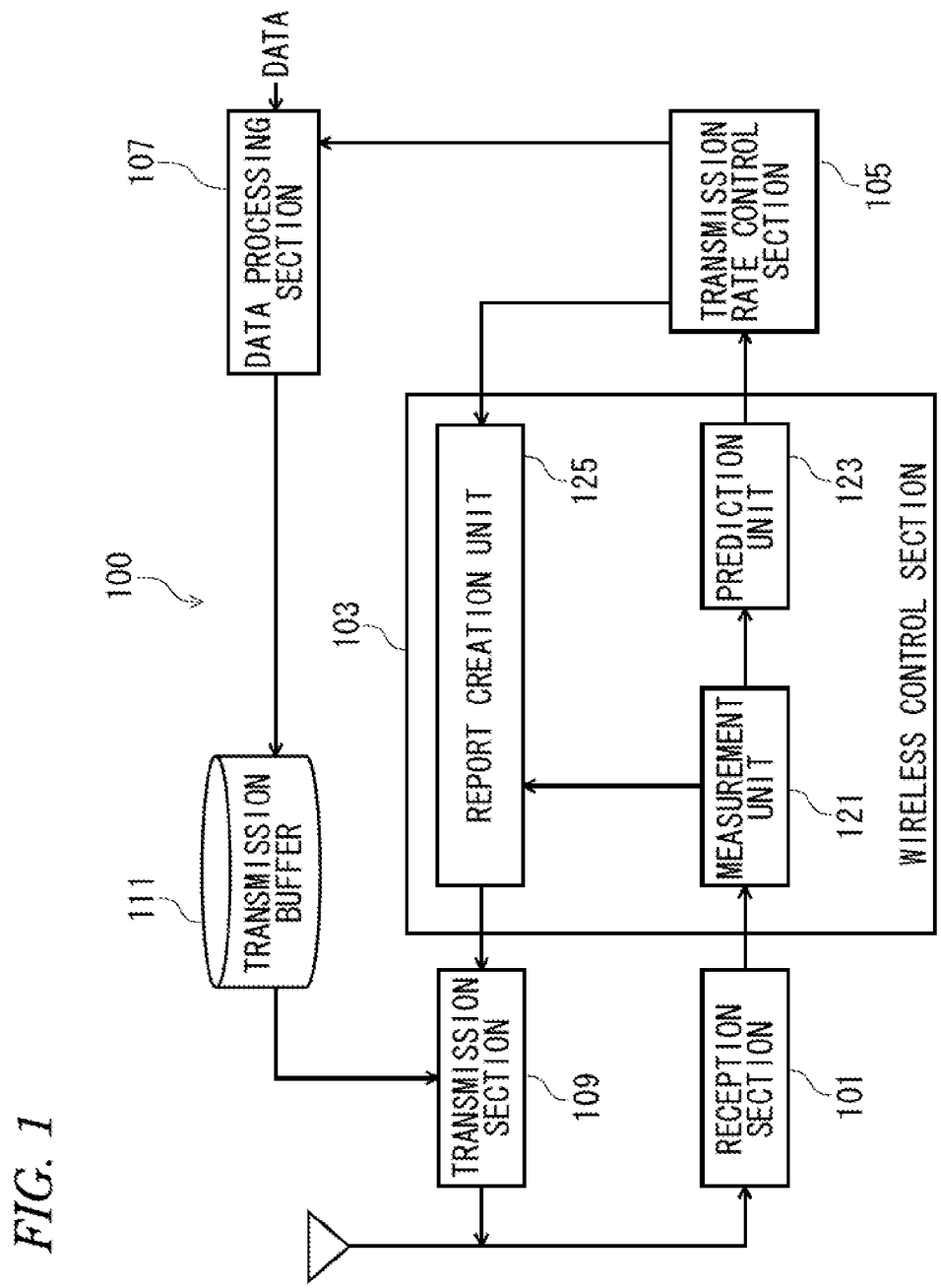
FIG. 1 is a block diagram illustrating an example of an internal configuration of a terminal according to a first embodiment.

FIG. 1 is a block diagram illustrating an example of an internal configuration of a terminal according to the first embodiment. As illustrated in FIG. 1, the terminal 100 according to the first embodiment includes a reception section 101, a wireless control section 103, a transmission rate control section 105, a data processing section 107, a transmission section 109, and a transmission buffer 111. The wireless control section 103 includes a measurement unit 121, a prediction unit 123, and a report creation unit 125.

The reception section 101 receives a reception quality measurement configuration (Measurement Configuration) and information for measuring reception quality transmitted from a wireless communication base station (hereinafter, simply referred to as a "base station"). The information for measuring reception quality is a pilot channel or the like including a reference signal. In addition, the reception section 101 receives position information of the terminal 100 using the Global Positioning System (GPS), control signals or user data from other base stations, a handover instruction sent from a serving base station, or the like.

The measurement unit 121 of the wireless control section 103 measures reception quality from the pilot channel including a reference signal, received by the reception section 101. The reception quality includes reception quality of a signal from a base station (serving base station) to which the terminal 100 is currently connected and reception quality of a signal from a base station providing a cell (neighbor cell) adjacent to a cell (serving cell) which is provided by the serving base station. Therefore, the measurement unit 121 measures each piece of reception quality of the serving cell and the neighbor cell on the basis of pilot channels from the respective base stations.

In addition, a measurement value of reception quality is Reference Signal Received Power (RSRP) or Reference Signal Received Quality (RSRQ) if a communication network used by the terminal 100 is an LTE network, Received Signal Code Power (RSCP) or Ec/NO if UMTS Terrestrial Radio Access (UTRA), Received Signal Strength Indicator (RSSI) if GERAN, and power of a pilot signal if CDMA2000.

Further, the measurement unit 121 determines whether or not a condition in which the terminal 100 sends a report (Measurement Report) regarding a reception quality measurement result to the base station is satisfied on the basis of a condition set in a reception quality measurement configuration of which the serving base station has notified. In the following description, the condition in which the terminal 100 sends a reception quality measurement result report to the base station is referred to as a "measurement result report condition". Furthermore, in the present embodiment, the meaning in which a measurement result report condition is satisfied while the terminal 100 transmits data using an LTE communication network indicates that there is a high probability of the occurrence of a handover in the near future.

The prediction unit 123 of the wireless control section 103 predicts in advance that a probability that a measurement result report condition may be satisfied within a specific time will be high on the basis of a measurement value of each piece of reception quality of the serving cell and/or the neighbor cell input from the measurement unit 121. In other words, before the measurement unit 121 determines that a measurement result report condition has been satisfied, the prediction unit 123 predicts that the determination will occur. A prediction method of the prediction unit 123 will be described later. When it is predicted that a probability that the measurement result report condition may be satisfied will be high, the prediction unit 123 notifies the transmission rate control section 105 of the fact.

The transmission rate control section 105 instructs the data processing section 107 to change a transmission rate of data which is transmitted from the terminal 100 to the base station to a low rate in response to the notification from the prediction unit 123 performed when the prediction unit 123 predicts that a probability that the measurement result report condition may be satisfied will be high. In the present embodiment, while the terminal 100 transmits data using an LTE communication network, the transmission rate control section 105 instructs changing to a transmission rate (for example, 384 kbps) or a communication path suitable for a 3G band. In addition, when a process of changing a transmission rate is completed in the data processing section 107, the transmission rate control section 105 may notify the wireless control section 103 of the fact.

The data processing section 107 performs data processing at a predetermined transmission rate in response to an instruction from the transmission rate control section 105. In addition, data processed by the data processing section 107 is video data, audio data, or the like.

If the measurement unit 121 determines that the measurement result report condition has been satisfied, the report creation unit 125 of the wireless control section 103 creates a reception quality measurement result report (Measurement Report) with a predetermined format based on the reception quality measurement configuration of which the base station has notified. The transmission section 109 transmits the reception quality measurement result report created by the report creation unit 125 and the data processed by the data processing section 107 to the base station. The transmission buffer 111 temporarily preserves the data until the transmission section 109 transmits the data processed by the data processing section 107.

Hereinafter, a detailed description will be made of a method in which the prediction unit 123 predicts in advance that a probability that a measurement result report condition may be satisfied will be high.

<First Prediction Method>

The prediction unit 123 sets an offset to a threshold value of a measurement value (hereinafter, referred to as a "reception power value") of reception quality which is indicated by a reception quality measurement configuration from the base station and is a condition for transmitting a reception quality measurement result report. For example, in a case where the reception quality measurement configuration is set so that a reception quality measurement result report is transmitted if a reception power value of the serving cell is lower than a threshold value (Event A2), the prediction unit 123 sets a value higher than the threshold value as a predictive threshold value. The prediction unit 123 predicts that a probability that a measurement result report condition may be satisfied within a specific time will be high when a reception power value is lower than the predictive threshold value.

<Second Prediction Method>

For example, in a case where the reception quality measurement configuration is set so that a reception quality measurement result report is transmitted if a reception power value of the serving cell is lower than a first threshold value, and a reception power value of the neighbor cell is higher than a second threshold value (Event A5 in Inter-RAT, and Event B2 in Inter-RAT), the prediction unit 123 sets an offset to each of the first and second threshold values. In other words, the prediction unit 123 sets a value higher than the first threshold value as a first predictive threshold value, and a value lower than the second threshold value as a second predictive threshold value. The prediction unit 123 predicts that a probability that a measurement result report condition may be satisfied within a specific time will be high when a reception power value of the serving cell is lower than the first predictive threshold value, and a reception of the neighbor cell is higher than the second predictive threshold value 2. In addition, respective values of the offsets set to the first threshold value and the second threshold value may be the same as or different from each other.

<Third Prediction Method>

The prediction unit 123 uses a difference between a reception power value of the serving cell and a reception power value of the neighbor cell, movement average values (a value obtained by filtering in Layer 3) of the respective reception power values of the serving cell and the neighbor cell, and the like. For example, in a case where the above Event B2 is indicated by a reception quality measurement configuration from the base station, the prediction unit 123 periodically calculates a difference between a reception power value of the serving cell and a reception power value of the neighbor cell, and slopes of variations in the respective reception power values of the serving cell and the neighbor cell. In this case, when the difference between the reception power value of the serving cell and the reception power value of the neighbor cell is equal to or more than a predefined value, the slope of a variation in the reception power value of the serving cell is a negative value, and the slope of a variation in the reception power value of the neighbor cell is a positive value, the prediction unit 123 predicts that a probability that a handover to the corresponding neighbor cell may occur and a measurement result report condition may be satisfied within a specific time will be high.

In addition, the prediction unit 123 may perform prediction by using the first to third prediction methods singly or in combination. In a case where a plurality of prediction methods are combined, prediction accuracy can be improved.

In addition, the terminal 100 has a GPS (Global Positioning System) function, and the prediction unit 123 may perform prediction by using the first to third prediction methods after taking into consideration a current position, a movement direction, a movement speed, a movement distance, or the like of the terminal 100 obtained from acquired position information. For example, in a case where the prediction unit 123 uses the first prediction method, if it is determined that the terminal 100 becomes distant from a center of the serving cell and becomes close to the neighbor cell from a current position, a movement direction, a movement speed, a movement distance, or the like of the terminal 100 when a reception power value of the serving cell is lower than the predictive threshold value, the prediction unit 123 predicts that a probability that a measurement result report condition may be satisfied within a specific time will be high.

Figure 2:
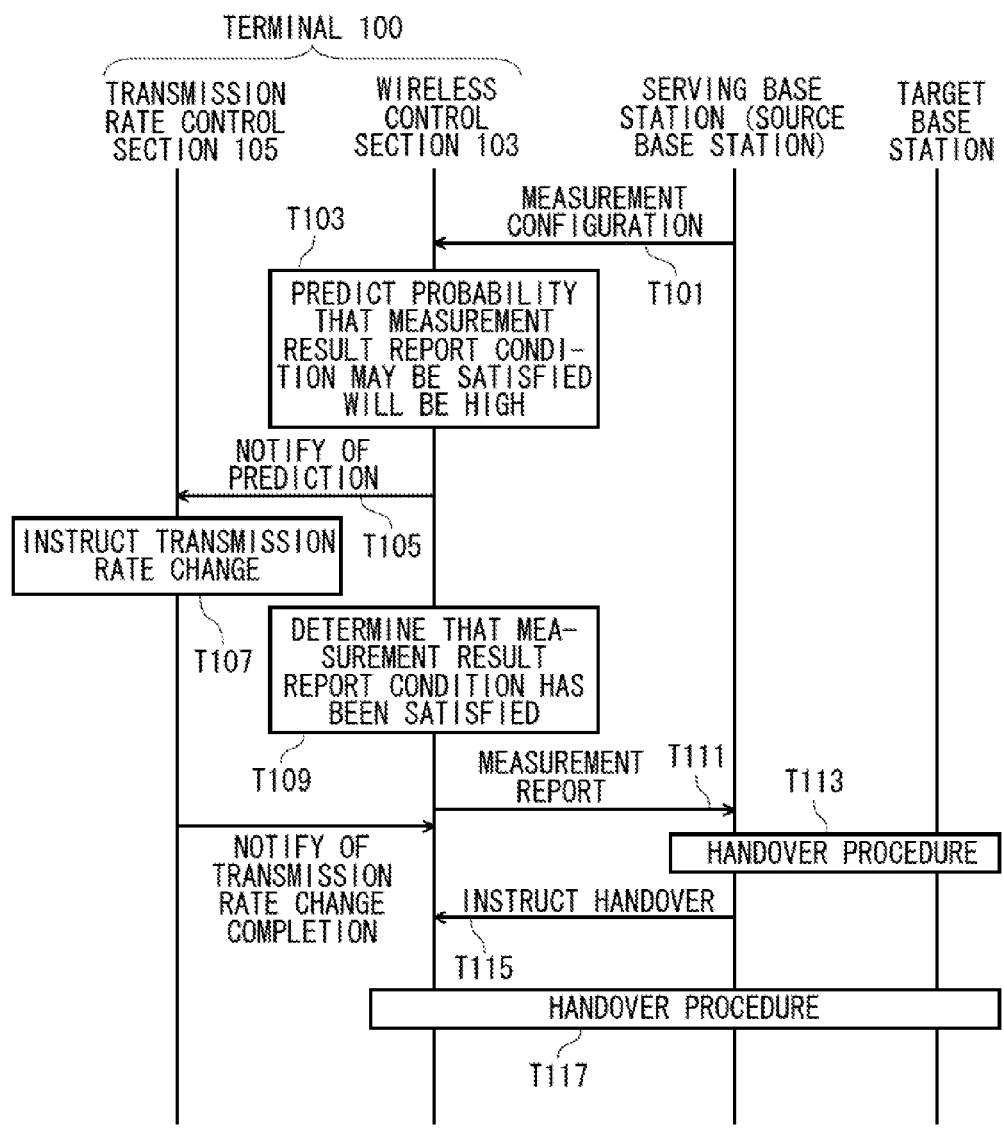
FIG. 2 is a sequence diagram illustrating an example of signaling between the terminal according to the first embodiment and a base station.

Hereinafter, with reference to FIG. 2, a description will be made of respective operations of the terminal 100, a serving base station (also referred to as a source base station), and a base station (target base station) which is a handover destination, and signaling, when the terminal 100 according to the first embodiment is handed over to another base station during connection to the serving base station. FIG. 2 is a sequence diagram illustrating an example of signaling between the terminal according to the first embodiment and a base station.

As illustrated in FIG. 2, the terminal 100 receives a reception quality measurement configuration (Measurement Configuration) transmitted from a serving base station (T101). The measurement unit 121 of the wireless control section 103 of the terminal 100 measures reception quality of respective signals from the serving base station and a base station providing a neighbor cell according to the reception quality measurement configuration. In the wireless control section 103, the measurement unit 121 measures reception quality, and the prediction unit 123 predicts in advance that a probability that a measurement result report condition may be satisfied within a specific time will be high (T103). In other words, before the measurement unit 121 determines that a measurement result report condition has been satisfied, the prediction unit 123 predicts that the determination will occur.

When it is predicted that a probability that the measurement result report condition may be satisfied will be high, the prediction unit 123 notifies the transmission rate control section 105 of the fact (T105). The transmission rate control section 105 instructs the data processing section 107 to perform changing to a transmission rate in a mobile communication system of a base station which is a handover destination (T107). In addition, when a process corresponding to the instruction for changing a transmission rate is completed in T107, the transmission rate control section 105 may send a notification of transmission rate change completion to the wireless control section 103.

Next, if the measurement unit 121 determines that the measurement result report condition has been satisfied (T109), the terminal 100 transmits a reception quality measurement result report (Measurement Report) created by the report creation unit 125 to the serving base station (T111). The serving base station which is a source base station performs a handover procedure with a base station (target base station) which is a handover destination (T113), and instructs the terminal 100 to be handed over to the target base station (T115). Subsequently, the terminal 100 performs a handover procedure with the target base station (T117).

Figure 3:
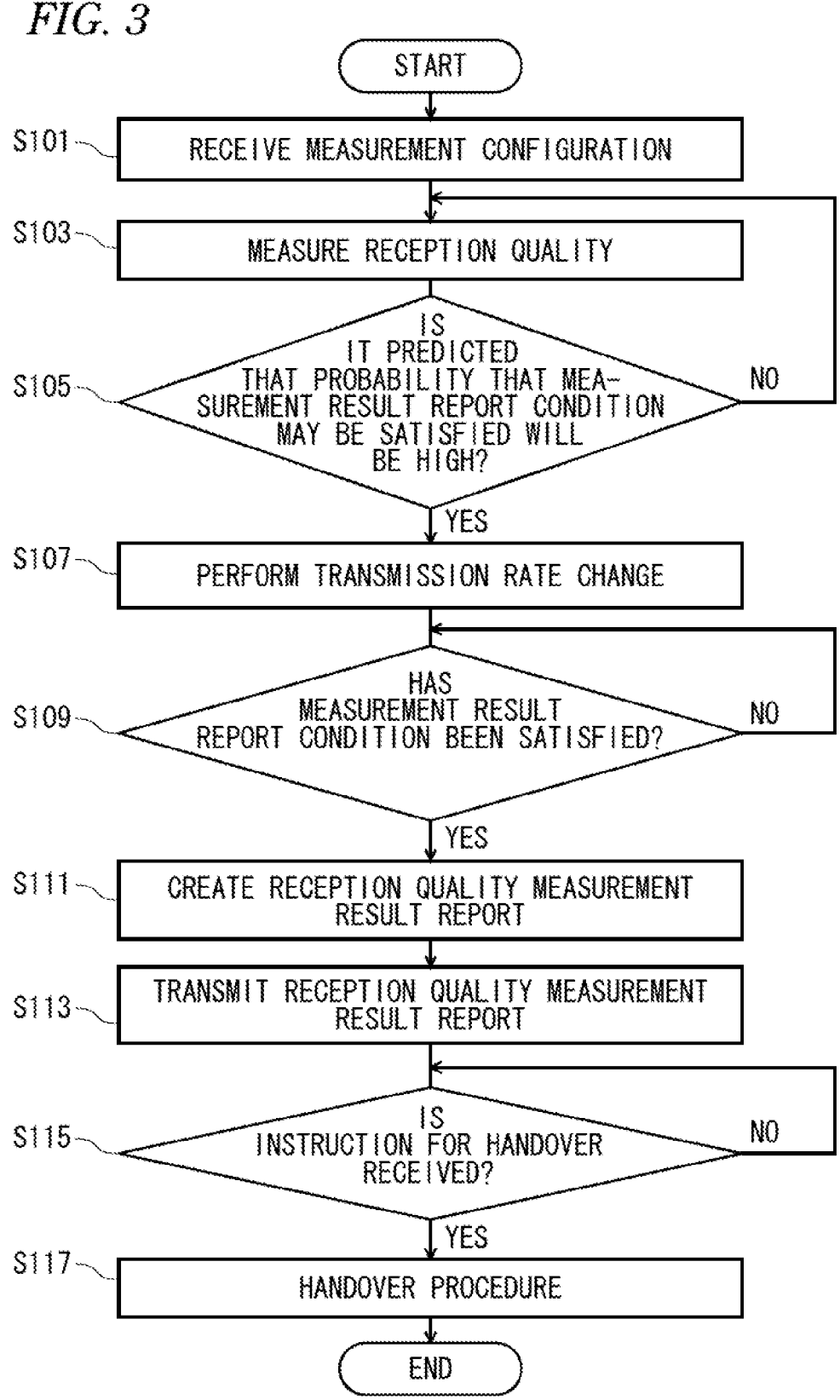
FIG. 3 is a flowchart illustrating an example of an operation of the terminal according to the first embodiment.

Among the above operations T101 to T117 described with reference to FIG. 2, the operation of the terminal 100 will now be described in detail with reference to FIG. 3. FIG. 3 is a flowchart illustrating an example of the operation of the terminal according to the first embodiment. As illustrated in FIG. 3, the reception section 101 receives a reception quality measurement configuration (Measurement Report) transmitted from the serving base station (step S101). The measurement unit 121 measures reception quality of respective signals from the serving base station and a base station providing a neighbor cell according to the reception quality measurement configuration (step S103). The prediction unit 123 determines whether or not a measurement result report condition will be satisfied within a specific time on the basis of the reception quality measured in step S103 (step S105). If it is predicted that a probability that the measurement result report condition may be satisfied will be high in step S105, the flow proceeds to step S107, and if it is predicted that a probability that the measurement result report condition may be satisfied will be low, the flow returns to step S103.

In step S107, the prediction unit 123 sends, to the transmission rate control section 105, a prediction notification that the measurement result report condition will be satisfied within a specific time, the transmission rate control section 105 instructs the data processing section 107 to process data at a transmission rate in a mobile communication system of the base station which is a handover destination, and the data processing section 107 performs a process of changing a transmission rate. Along with step S105 and step S107, the measurement unit 121 determines whether or not the measurement result report condition has been satisfied (step S109), and if it is determined that the measurement result report condition has been satisfied, the flow proceeds to step S111. In step S111, the report creation unit 125 creates a reception quality measurement result report (Measurement Report) with a predetermined format based on the reception quality measurement configuration. Next, the transmission section 109 transmits the reception quality measurement result report (Measurement Report) to the serving base station (step S113).

Next, if the reception section 101 receives a handover instruction transmitted from the serving base station (Yes in step S115), the terminal 100 performs a handover procedure with a base station (target base station) which is a handover destination designated by the instruction (step S117), and is handed over to the target base station.

In addition, the report creation unit 125 may instruct the transmission rate control section 105 to change a transmission rate at the timing of transmitting the reception quality measurement result report created by the report creation unit 125.

As described above, in the present embodiment, when the terminal 100 predicts that the probability that a measurement result report condition may be satisfied within a specific time will be high, the terminal 100 changes settings in advance so that data is processed at a transmission rate in a mobile communication system of a base station which is a handover destination. In the above description, in a case where a serving base station (source base station) is a base station using an LTE network (a throughput thereof is about 1 to 2 Mbps), and a target base station is a base station using a 3G network (a throughput thereof is about 384 kbps), the terminal 100 already performs a change to a transmission rate suitable for the 3G network even if an Inter-RAT handover is performed after a measurement result report condition is actually satisfied in the terminal 100. For this reason, there is no occurrence of buffer overflow due to storage of data in the transmission buffer 111 of the terminal 100 after the Inter-RAT handover is performed. As a result, even if a handover (inter-RAT handover) to a base station of the 3G network occurs when the terminal 100 transmits video data to a partner terminal via the LTE network, interruption or irregularity of videos does not occur in the partner terminal, and thus it is possible to realize stable transmission of video data.

(Second embodiment)

Figure 4:
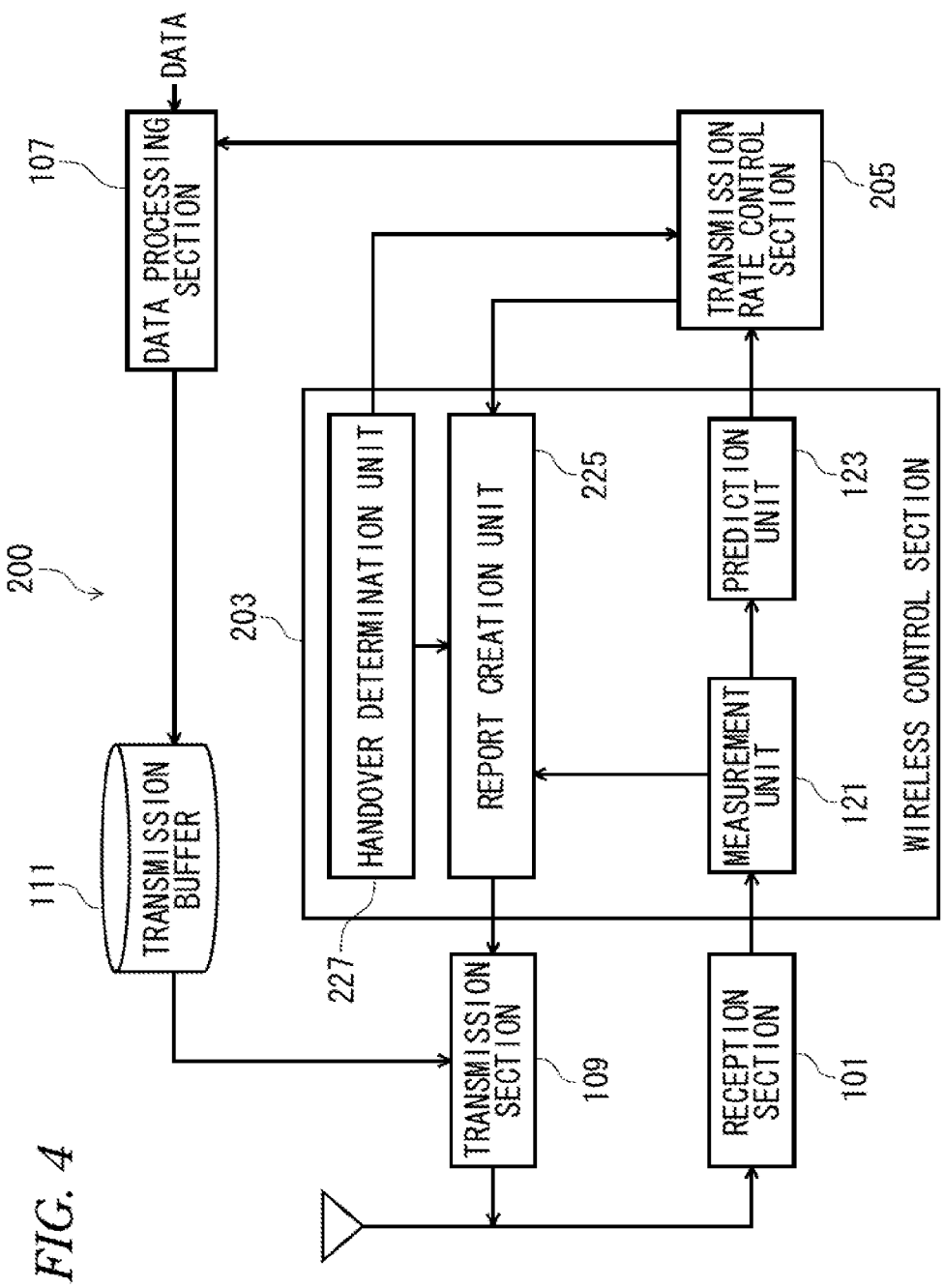
FIG. 4 is a block diagram illustrating an example of an internal configuration of a terminal according to a second embodiment.

FIG. 4 is a block diagram illustrating an example of an internal configuration of a terminal according to the second embodiment. A main difference of a terminal 200 according to the second embodiment from the terminal 100 according to the first embodiment is an internal configuration of a wireless control section 203, and a transmission rate control section 205. The second embodiment is the same as the first embodiment except for this, and, in FIG. 4, the same reference numerals are given to constituent elements common to FIG. 1. In the following description, descriptions of parts identical or equivalent to those of the first embodiment will be abridged or omitted.

The transmission rate control section 205 according to the present embodiment instructs the data processing section 107 to change a transmission rate of data which is transmitted from the terminal 200 to the base station to a low rate in response to a notification from the prediction unit 123 performed when the prediction unit 123 predicts that a probability that the measurement result report condition may be satisfied will be high, or a notification from a handover determination unit 227 performed when the handover determination unit 227 of the wireless control section 203 determines that an Inter-RAT handover is performed. In addition, when a process of changing a transmission rate is completed in the data processing section 107, the transmission rate control section 205 notifies the wireless control section 203 of the fact.

As illustrated in FIG. 4, the wireless control section 203 of the terminal 200 according to the present embodiment includes a measurement unit 121, a prediction unit 123, a report creation unit 225, and a handover determination unit 227. The measurement unit 121 and the prediction unit 123 are the same as those of the first embodiment. The report creation unit 225 creates a reception quality measurement result report with a handover request flag (Measurement Report with HO request flag) when a notification of transmission rate change completion described later is received from the transmission rate control section 205.

FIG. 5 is a diagram illustrating an example of a format of a reception quality measurement result report with a handover request flag. In addition, the format illustrated in FIG. 5 is one in which a handover request flag is inserted into an extension field inside "MeasResults" which is a format of a reception quality measurement result report (Measurement Report) predefined by the standards body 3GPP (The 3rd Generation Partnership Project).

A parameter "handoverRequest" is assumed to be a 1-bit flag (Off state at '0' and On state at "1") which indicates a handover request from the terminal 200 to a base station. In a case where the terminal 200 requests a handover for a base station before a measurement result report condition is satisfied, the terminal sets a value of "handoverRequest" to 1" to the base station. In a case of a normal reception quality measurement result report transmitted when a measurement result report condition is satisfied, the terminal sets a value of "handoverRequest" to "0" to the base station. When a reception quality measurement result report with the handover request flag of which a value is set to "1" is received from the terminal 200, the serving base station which is a source base station selects a base station with high reception quality from a neighbor cell shown in the reception quality measurement result report, so as to set the selected base station as a target base station. In addition, in a case of a normal reception quality measurement result report transmitted when a measurement result report condition is satisfied, the report may use a format of "Measurement Report" predefined by 3GPP, which does not include a handover request flag.

FIG. 6 is a diagram illustrating another example of a format of a reception quality measurement result report with a handover request flag. Also in the example illustrated in FIG. 6, in the same manner as in the example illustrated in FIG. 5, the format is one in which a handover request flag is inserted into an extension field inside "MeasResults" which is a format of a reception quality measurement result report (Measurement Report) predefined by the standards body 3GPP. In addition, this is also the same for the parameter "handoverRequest".

In the example illustrated in FIG. 6, the terminal 200 designates a cell which will become a handover destination from a reception quality measurement list of neighbor cells, and inserts a handover request flag thereinto. In a case of the example illustrated in FIG. 6, a single cell is designated among neighbor cells of UTRA (3G), and a handover request flag of which a value is set to "1" is inserted into an extension field of "MeasResult" for transmission to the base station. When a reception quality measurement result report with the handover request flag of which a value is set to "1" is received from the terminal 200, the serving base station which is a source base station selects a neighbor cell indicated by "handoverRequest" in the reception quality measurement result report as a target base station. In addition, in a case of a normal reception quality measurement result report transmitted when a measurement result report condition is satisfied, the report may use a format of "Measurement Report" predefined by 3GPP, which does not include a handover request flag.

The handover determination unit 227 determines necessity and unnecessity of an Inter-RAT handover, regardless of reception power of the serving base station or a base station providing a neighbor cell, on the basis of an application used by the terminal 200 or a battery residual quantity thereof. When the Inter-RAT handover is determined to be performed, the handover determination unit 227 notifies the transmission rate control section 205 of the fact.

In a case where a handover is determined based on an application, the handover determination unit 227 selects a network (for example, LTE) in which communication can be performed at a high transmission rate if an application used by the terminal 200 needs wide bands, such as transmission of videos, and selects a network (for example, 3G) in which communication is performed at a low transmission rate if an application does not need bands as wide as transmission of videos, such as voice communication, the selected network is different from the currently connected network, the handover determination unit 227 determines that an Inter-RAT handover is performed. In addition, in a case where a plurality of applications are used together, an application which needs more bands is determined using an application with the highest priority as a reference.

In addition, in a case where a handover is determined based on a battery residual quantity of the terminal 200, the handover determination unit 227 selects a network (for example, LTE) in which communication can be performed at a high transmission rate if a battery residual quantity is equal to or more than a predefined value, and selects a network (for example, 3G) in which communication is performed at a low transmission rate if a battery residual quantity is lower than the predefined value. The handover determination unit 227 determines that the Inter-RAT handover is performed if a selected network is different from a network to which connection is in progress.

Further, a round trip time (RTT) of a communication packet may be used as other triggers when the handover determination unit 227 determines a handover. Furthermore, if retransmission information (for example, the number of NACKs for instructing retransmission) from a lower layer exceeds a predefined value, the handover determination unit 227 may determine that an Inter-RAT handover to 3G is performed. Moreover, if the number of RLC PDUs received for the unit time is lower than a predefined value, the handover determination unit 227 may determine that an Inter-RAT handover from LTE to 3G is performed.

Hereinafter, with reference to FIG. 7, a description will be made of respective operations of the terminal 200, a serving base station (also referred to as a source base station), and a base station (target base station) which is a handover destination, and signaling, when the terminal 200 according to the second embodiment is handed over to another base station during connection to the serving base station. FIG. 7 is a sequence diagram illustrating an example of signaling between the terminal according to the second embodiment and a base station. In the following description, an operation of a part which is identical or equivalent to the sequence diagram of the first embodiment illustrated in FIG. 2 will be abridged or omitted.

As illustrated in FIG. 7, in the wireless control section 203, the measurement unit 121 measures reception quality, the prediction unit 123 predicts in advance that a probability that a measurement result report condition may be satisfied within a specific time will be high, and the handover determination unit 227 determines necessity and unnecessity of an Inter-RAT handover (T203). When it is predicted that a probability that the measurement result report condition may be satisfied will be high, the prediction unit 123 notifies the transmission rate control section 205 of the fact (T205). In addition, when it is determined that the Inter-RAT handover is performed, the handover determination unit 227 notifies the transmission rate control section 205 of the fact (T205). The transmission rate control section 205 instructs the data processing section 107 to perform changing to a transmission rate in a communication network of a base station which is a handover destination (T107).

Next, when the wireless control section 203 receives a notification (a notification of transmission rate change completion) indicating that the transmission rate change is completed (T209), the terminal 200 transmits a reception quality measurement result report with a handover request flag (Measurement Report with HO request flag) created by the report creation unit 225 to the serving base station (T211). The subsequent operations are the same as in the first embodiment. In addition, in a case where the terminal 200 transmits the reception quality measurement result report with a handover request flag to the serving base station, even if a measurement result report condition is satisfied thereafter, the report creation unit 225 does not create a reception quality measurement result report for notifying of the fact.

The terminal 200 according to the present embodiment may transmit a reception quality measurement result report with a handover request flag in response to not only the notification of transmission rate change completion but also a trigger inside the terminal. In this case, a handover from a currently connected wireless communication system (for example, LTE) to another wireless communication system (for example, HSDPA) is determined by the handover determination unit 227 illustrated in FIG. 4. At this time, the handover determination unit 227 instructs the report creation unit 225 to create and transmit a reception quality measurement result report with a handover request flag. In a case where a transmission rate is reduced such as a handover from LTE to 3G, the handover determination unit 227 simultaneously sends a notification to the transmission rate control section 205. In a case of a handover accompanied by the transmission rate change, the report creation unit 225 may wait for a notification of transmission rate change completion, and then transmit a reception quality measurement result report with a handover request flag.

Among the above operations T101 to T117 described with reference to FIG. 7, the operation of the terminal 200 will now be described in detail with reference to FIG. 8. FIG. 8 is a flowchart illustrating an example of the operation of the terminal according to the second embodiment. In the following description, a description of a step of a part which is identical or equivalent to the flowchart of the first embodiment illustrated in FIG. 3 will be abridged or omitted.

After step S103, the prediction unit 123 determines whether or not a measurement result report condition will be satisfied within a specific time on the basis of the reception quality measured in step S103, and the handover determination unit 227 determines whether or not an Inter-RAT handover is performed (step S205). If it is predicted that a probability that the measurement result report condition may be satisfied will be high or it is determined that the Inter-RAT handover is performed in step S205, the flow proceeds to step S107, and, in any other case, the flow returns to step S103. After step S107, it is determined whether or not the wireless control section 203 has received a notification of transmission rate change completion (step S209), and, if the notification of transmission rate change completion has been received, the flow proceeds to step S211.

In step S211, the report creation unit 225 creates a reception quality measurement result report with a handover request flag (Measurement Report with HO request flag) with a predetermined format based on the reception quality measurement configuration. Next, the transmission section 109 transmits the reception quality measurement result report with a handover request flag (Measurement Report with HO request flag) to the serving base station (step S213). Step S213 follows step S115, and the subsequent steps are the same as in the first embodiment.

As described above, in the present embodiment, when the transmission rate change is completed, the terminal 200 requests an Inter-RAT handover for the serving base station without waiting for a measurement result report condition thereafter to be satisfied. Therefore, it is possible to start transmission early at an appropriate transmission rate. In addition, it is possible to perform transmission at an appropriate transmission rate depending on use circumstances of the terminal such as an application which is used or a battery residual quantity.

Further, the second embodiment is also applicable to a case where a serving base station is a base station using a 3G network, and a target base station is a base station using an LTE network. When an application needing a high transmission rate or the like is used, such as video communication, the terminal 200 determines an Inter-RAT handover from a 3G network to an LTE network, and starts to scan LTE networks. At this time, if there is a cell of an LTE network which will become a handover destination, the terminal 200 transmits a reception quality measurement result report with a handover request flag to a serving base station.

(Third Embodiment)

Figure 9:
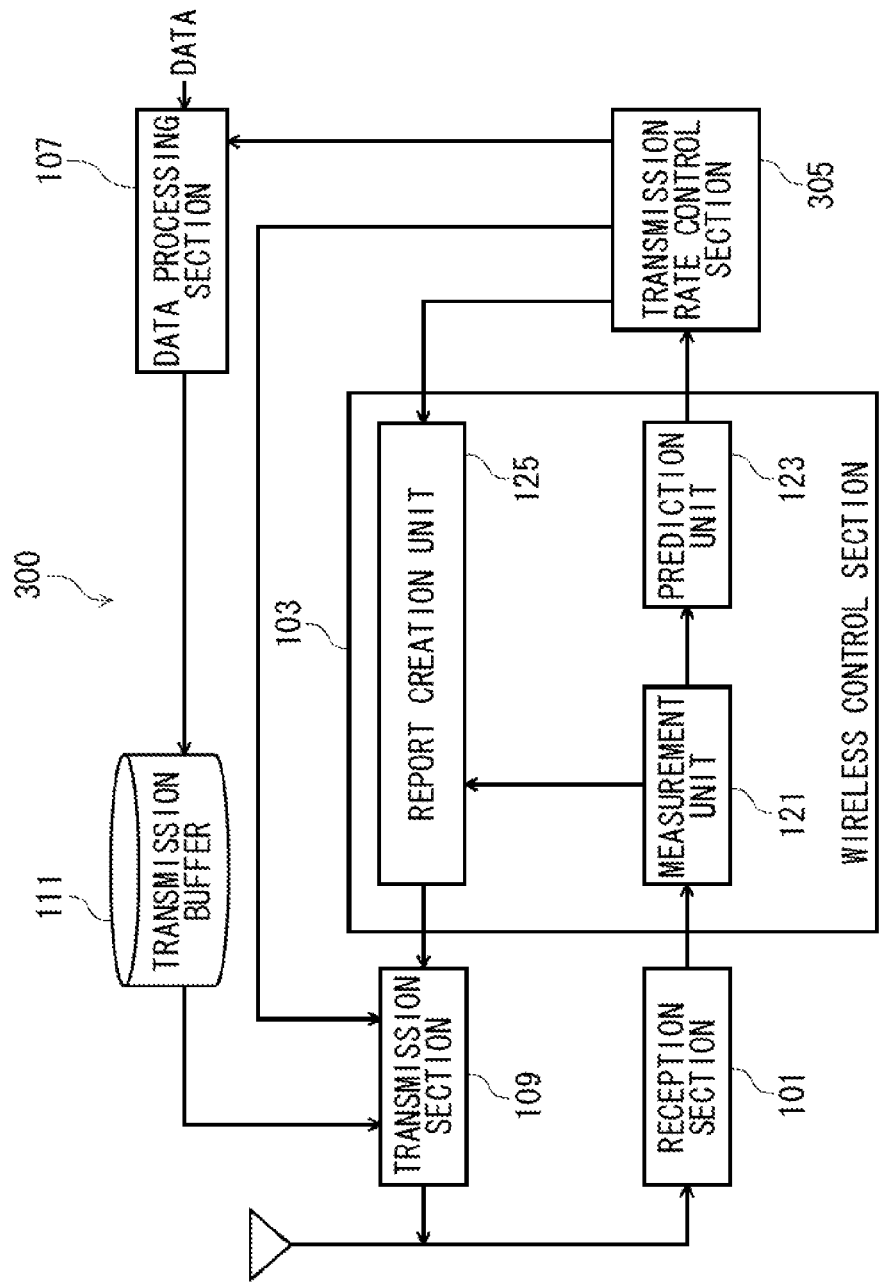
FIG. 9 is a block diagram illustrating an example of an internal configuration of a terminal according to a third embodiment.

FIG. 9 is a block diagram illustrating an example of an internal configuration of a terminal according to the third embodiment. A main difference of a terminal 300 according to the third embodiment from the terminal 100 according to the first embodiment is a transmission rate control section 305. The third embodiment is the same as the first embodiment except for this, and, in FIG. 9, the same reference numeral is given to a constituent element common to FIG. 1. In the following description, description of a part identical or equivalent to that of the first embodiment will be abridged or omitted.

The transmission rate control section 305 according to the present embodiment instructs the data processing section 107 to perform changing to a transmission rate of a network related to a mobile communication system of a base station which is a handover destination before performing an Inter-RAT handover, and also instructs a partner terminal to change a transmission rate of the partner terminal which is a data transmission destination to the same transmission rate. The instruction is sent from the transmission section 109 to the partner terminal via a serving base station.

Figure 10:
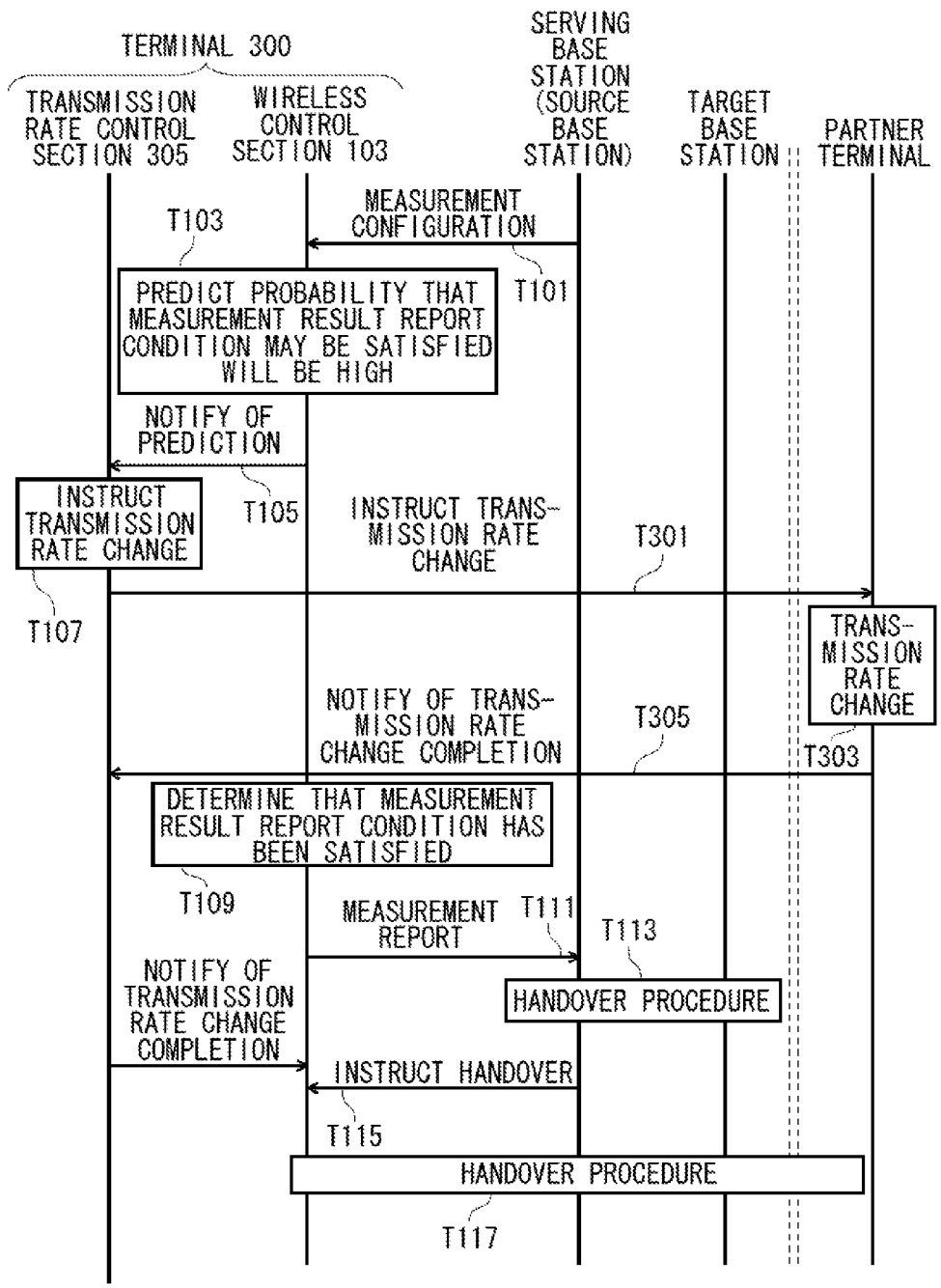
FIG. 10 is a sequence diagram illustrating an example of signaling between the terminal according to the third embodiment and a base station.

Hereinafter, with reference to FIG. 10, a description will be made of respective operations of the terminal 300, a serving base station (also referred to as a source base station), a base station (target base station) which is a handover destination, a partner terminal, and signaling, when the terminal 300 according to the third embodiment is handed over to another base station during connection to the serving base station. FIG. 10 is a sequence diagram illustrating an example of signaling between the terminal according to the third embodiment and a base station. In the following description, an operation of a part which is identical or equivalent to the sequence diagram of the first embodiment illustrated in FIG. 10 will be abridged or omitted.

As illustrated in FIG. 10, the transmission rate control section 305 instructs the data processing section 107 to perform changing to a transmission rate of a communication network related to a base station which is a handover destination (T107), and then instructs the partner terminal to change a transmission rate in the partner terminal to the same transmission rate of the communication network (T301). The partner terminal changes the transmission rate in response to the instruction (T303), and sends a notification of transmission rate change completion if the change is completed (T305). Subsequently, in the terminal 300, if the measurement unit 121 determines that a measurement result report condition has been satisfied (T109), operations in and after Till are performed in the same manner as in the first embodiment. In addition, the operation in T109 may be performed before the notification of transmission rate change completion illustrated in T305 is received.

As described above, according to the present embodiment, a transmission rate is changed in the own terminal, and a partner terminal which is a data transmission destination is instructed to change a transmission rate. Therefore, there is no occurrence of buffer overflow due to storage of data in the transmission buffer 111 and a reception buffer (not illustrated) included in the terminal 300 and the partner terminal after the Inter-RAT handover is performed. As a result, even if a handover (Inter-RAT handover) to a base station of the 3G network occurs when the terminal 300 transmits video data to a partner terminal via the LTE network, interruption or irregularity of videos does not occur in the partner terminal, and thus it is possible to realize stable transmission of video data.

(Fourth embodiment)

Figure 11:
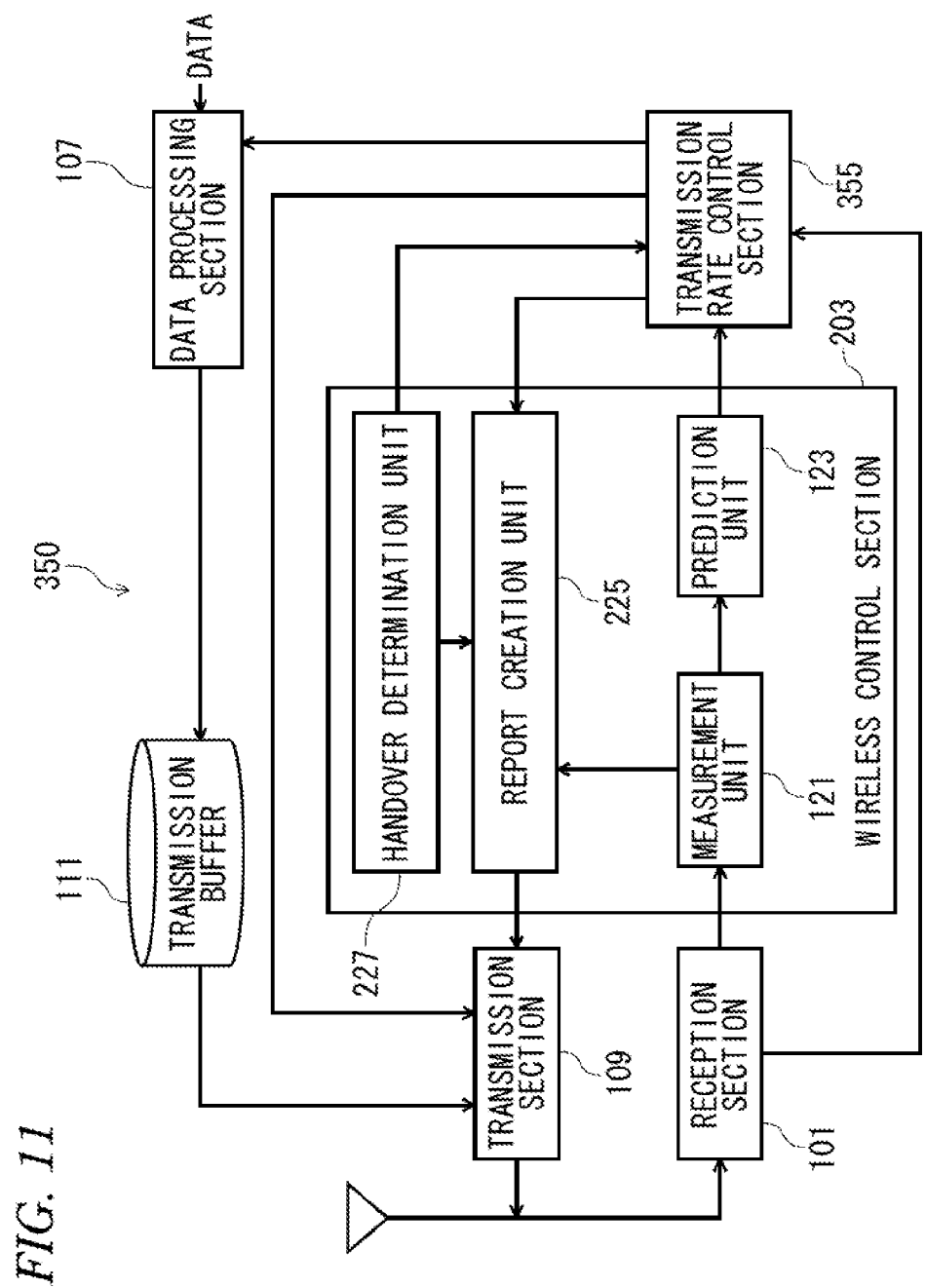
FIG. 11 is a block diagram illustrating an example of an internal configuration of a terminal according to a fourth embodiment.

FIG. 11 is a block diagram illustrating an example of an internal configuration of a terminal according to the fourth embodiment. A main difference of a terminal 350 according to the fourth embodiment from the terminal 200 according to the second embodiment is a transmission rate control section 355. The fourth embodiment is the same as the second embodiment except for this, and, in FIG. 11, the same reference numeral is given to a constituent element common to FIG. 4. In the following description, description of a part identical or equivalent to that of the second embodiment will be abridged or omitted.

The transmission rate control section 355 according to the present embodiment instructs the data processing section 107 to perform changing to a transmission rate of a network related to a mobile communication system of a base station which is a handover destination before performing an Inter-RAT handover, and also instructs a partner terminal to change a transmission rate of the partner terminal which is a data transmission destination to the same transmission rate. The instruction is sent from the transmission section 109 to the partner terminal via a serving base station.

Figure 12:
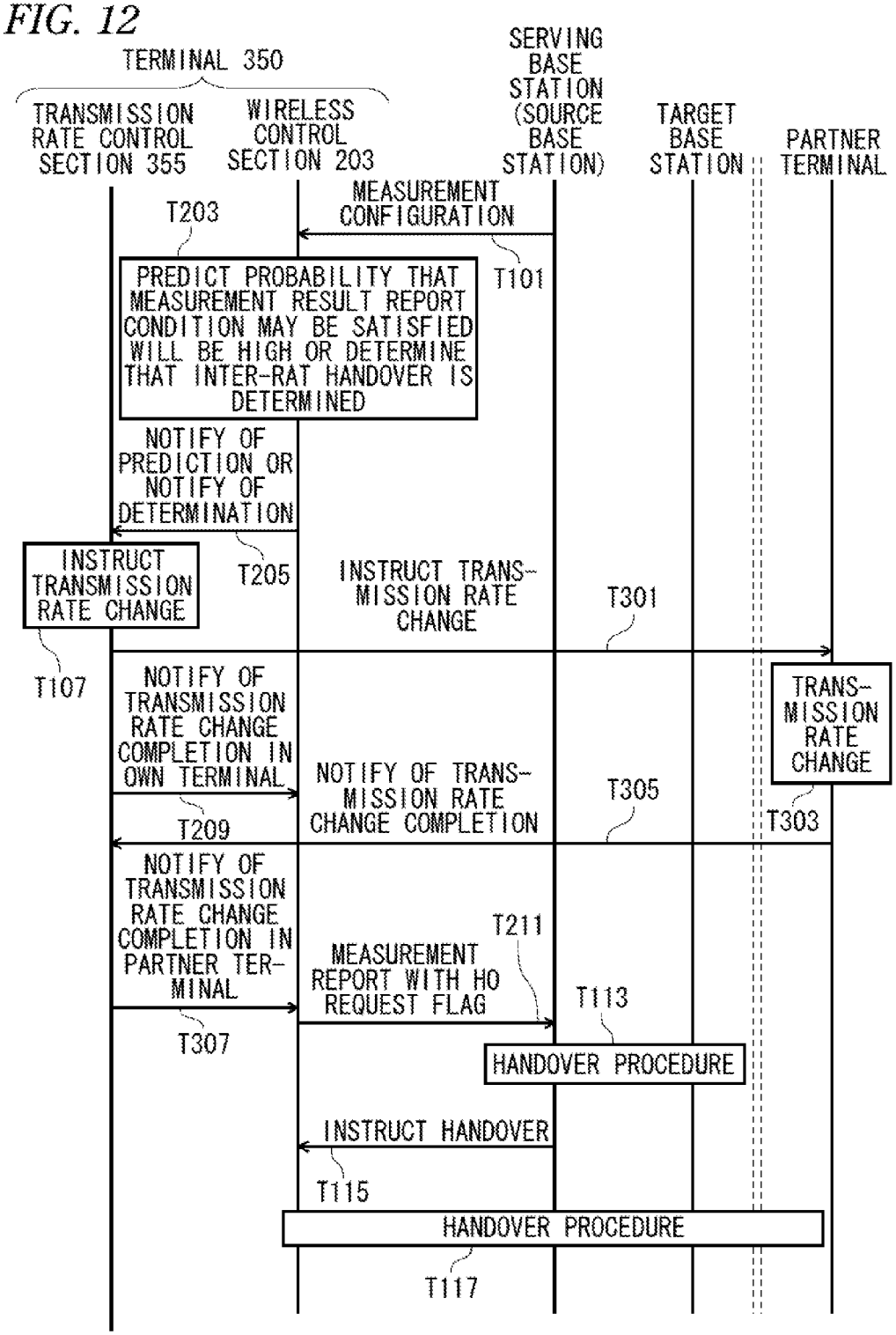
FIG. 12 is a sequence diagram illustrating an example of signaling between the terminal according to the fourth embodiment and a base station.

Hereinafter, with reference to FIG. 12, a description will be made of respective operations of the terminal 350, a serving base station (also referred to as a source base station), a base station (target base station) which is a handover destination, a partner terminal, and signaling, when the terminal 350 according to the fourth embodiment is handed over to another base station during connection to the serving base station. FIG. 12 is a sequence diagram illustrating an example of signaling between the terminal according to the fourth embodiment and a base station. In the following description, an operation of a part which is identical or equivalent to the sequence diagram of the second embodiment illustrated in FIG. 12 will be abridged or omitted.

As illustrated in FIG. 12, the transmission rate control section 355 instructs the data processing section 107 to perform changing to a transmission rate of a communication network related to a base station which is a handover destination (T107), and then instructs the partner terminal to change a transmission rate in the partner terminal to the same transmission rate of the communication network (T301). The partner terminal changes the transmission rate in response to the instruction (T303), and sends a notification of transmission rate change completion if the change is completed (T305). Subsequently, the transmission rate control section 355 sends a notification indicating that the transmission rate change is completed in the partner terminal to the wireless control section 203 (T307), and if the wireless control section 203 receives the notification indicating that the transmission rate change is completed in the own terminal (T209), operations in and after T211 are performed in the same manner as in the second embodiment.

As described above, according to the present embodiment, a transmission rate is changed in the own terminal, and a partner terminal which is a data transmission destination is instructed to change a transmission rate. Therefore, there is no occurrence of buffer overflow due to storage of data in the transmission buffer 111 and a reception buffer (not illustrated) included in the terminal 350 and the partner terminal after the Inter-RAT handover is performed. As a result, even if a handover (Inter-RAT handover) to a base station of the 3G network occurs when the terminal 350 transmits video data to a partner terminal via the LTE network, interruption or irregularity of videos does not occur in the partner terminal, and thus it is possible to realize stable transmission of video data.

(Fifth embodiment)

Figure 13:
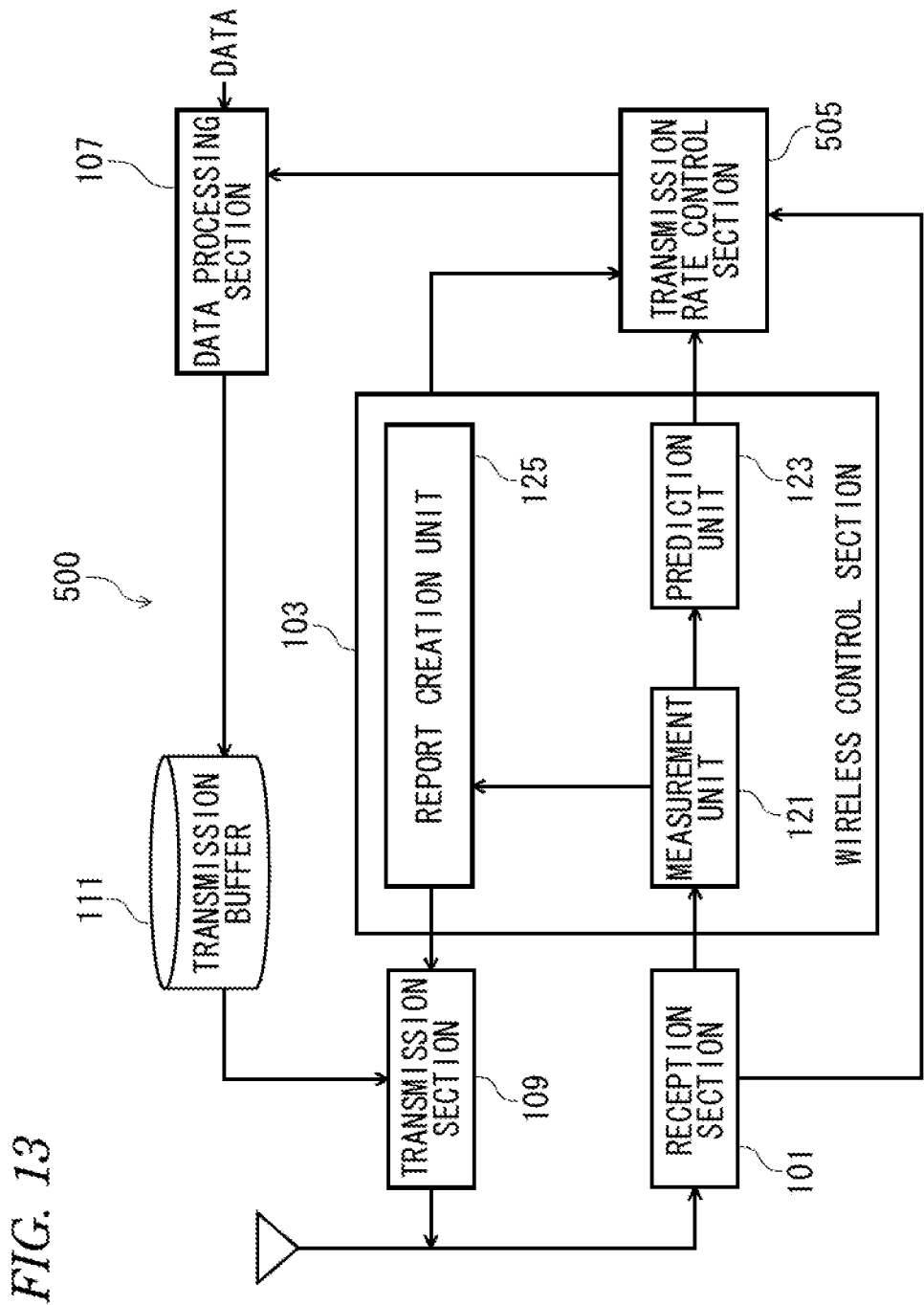
FIG. 13 is a block diagram illustrating an example of an internal configuration of a terminal according to a fifth embodiment.

FIG. 13 is a block diagram illustrating an example of an internal configuration of a terminal according to the fifth embodiment. A main difference of a terminal 500 according to the fifth embodiment from the terminal 100 according to the first embodiment is a transmission rate control section 505. The fifth embodiment is the same as the first embodiment except for this, and, in FIG. 13, the same reference numeral is given to a constituent element common to FIG. 1. In the following description, description of a part identical or equivalent to that of the first embodiment will be abridged or omitted.

The transmission rate control section 505 receives an instruction for an identical-type handover (for example, a handover between LTEs) sent from a serving base station, and stops instructing the data processing section 107 to change a transmission rate.

Figure 14:
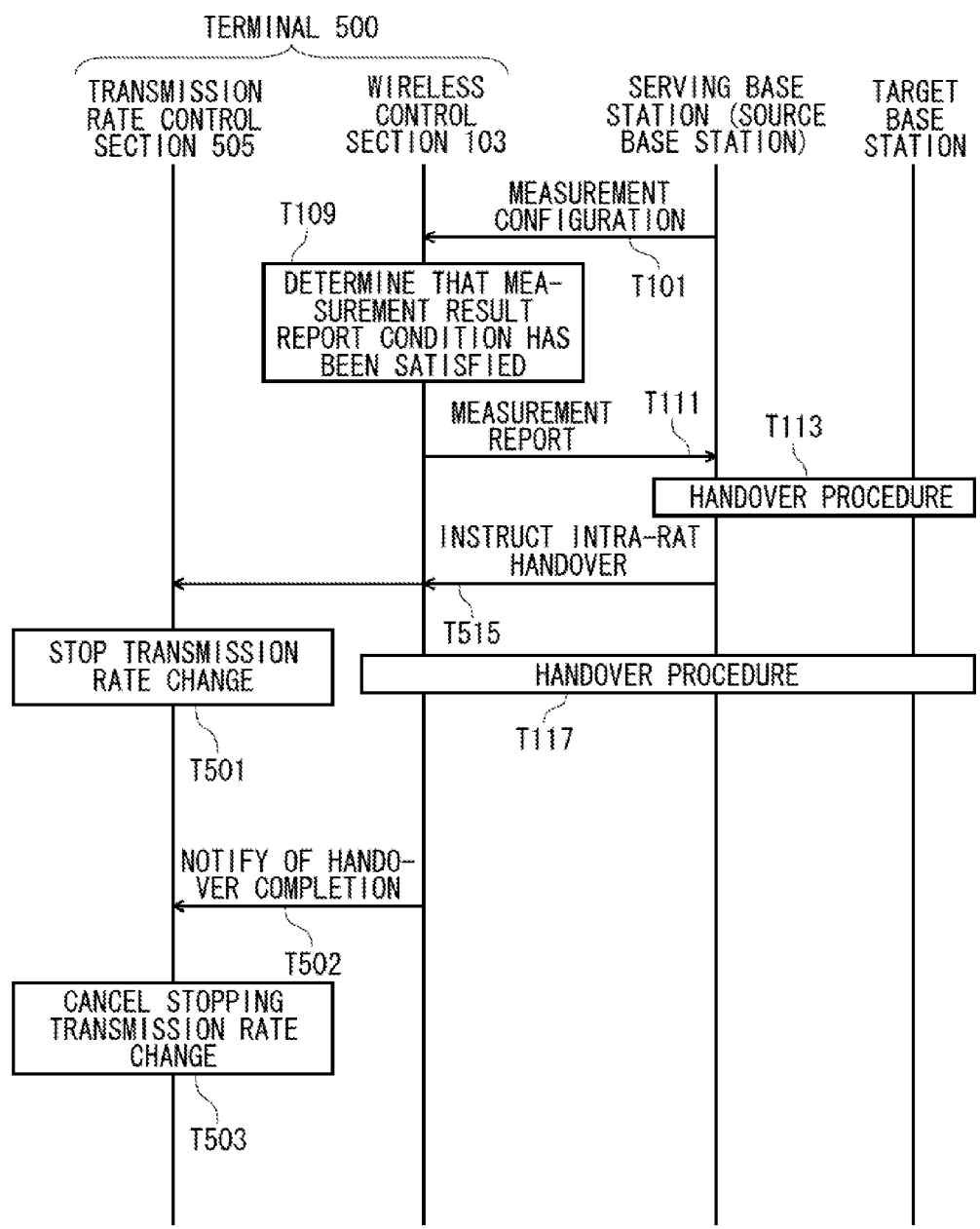
FIG. 14 is a sequence diagram illustrating an example of signaling between the terminal according to the fifth embodiment and a base station.

Hereinafter, with reference to FIG. 14, a description will be made of respective operations of the terminal 500, a serving base station (also referred to as a source base station), and a base station (target base station) which is a handover destination, and signaling, when the terminal 500 according to the fifth embodiment is handed over to another base station during connection to the serving base station. FIG. 14 is a sequence diagram illustrating an example of signaling between the terminal according to the fifth embodiment and a base station. In the following description, an operation of a part which is identical or equivalent to the sequence diagram of the first embodiment illustrated in FIG. 2 will be abridged or omitted.

As illustrated in FIG. 14, if the terminal 500 receives an Intra-RAT handover instruction sent from the serving base station (T515), the transmission rate control section 505 stops instructing the data processing section 107 to change a transmission rate (T501). Subsequently, when a notification of handover completion (T502) is received from the wireless control section 103, the transmission rate control section 505 cancels stopping of instructing the data processing section 107 to change a transmission rate (T503).

Figure 15:
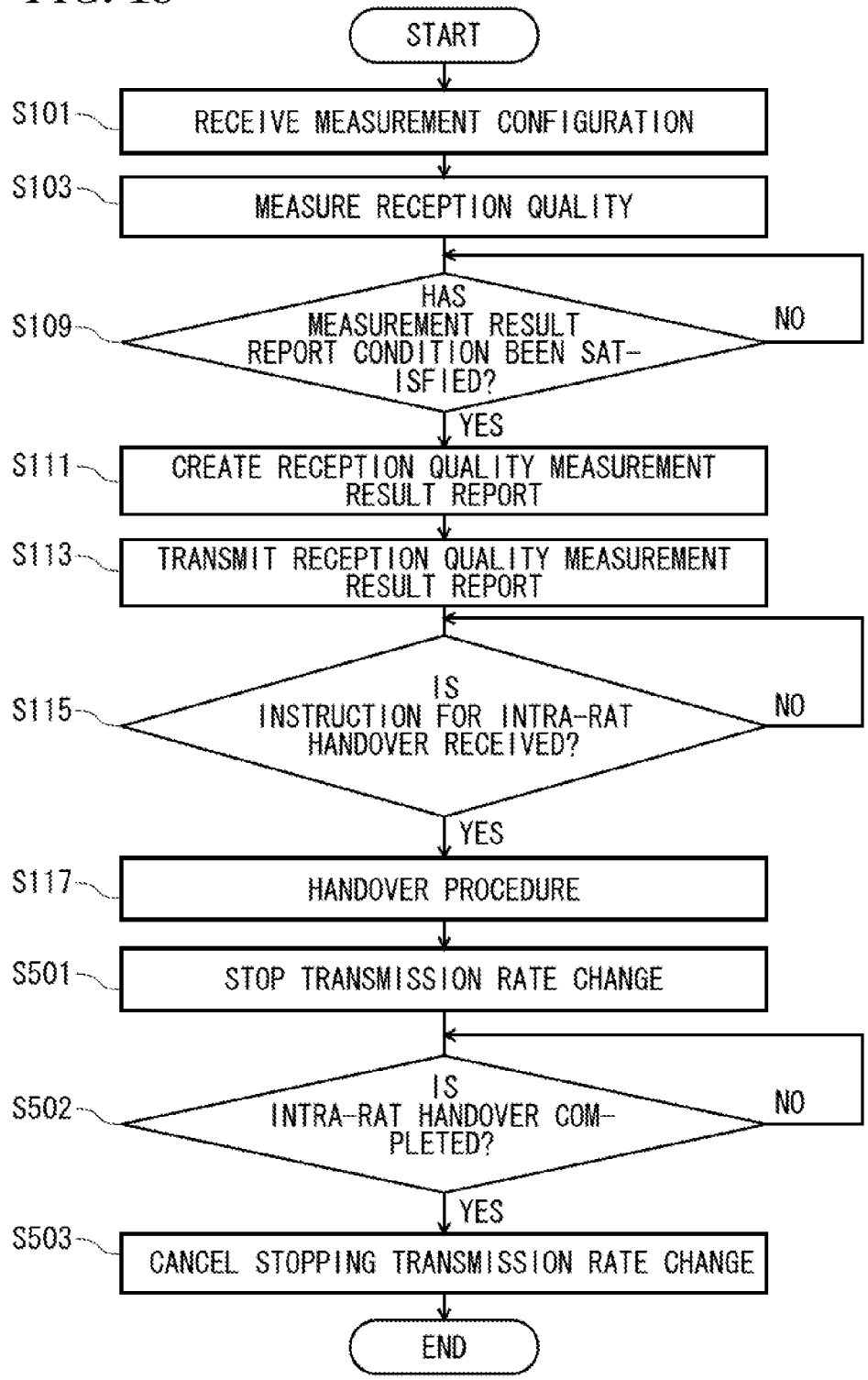
FIG. 15 is a flowchart illustrating an example of an operation of the terminal according to the fifth embodiment.

FIG. 15 is a flowchart illustrating an example of the operation of the terminal according to the fifth embodiment. In the following description, a description of a step of a part which is identical or equivalent to the flowchart of the first embodiment illustrated in FIG. 3 will be abridged or omitted. As illustrated in FIG. 15, after step S115, the transmission rate control section 505 receives an Intra-RAT handover instruction sent from the serving base station (source base station), and stops instructing the data processing section 107 to change a transmission rate (step S501). Subsequently, when a notification of Intra-RAT handover completion is received from the wireless control section 103 in step S502, the flow proceeds to step S503. In step S503, the transmission rate control section 505 cancels stopping of instructing the data processing section 107 to change a transmission rate, performed in step S501. In addition, the operations in step S117 and step S501 may be simultaneously performed.

As described above, according to the present embodiment, since a transmission rate can be prevented from being changed when an Intra-RAT handover is performed, it is possible to realize stable data transmission at an optimal transmission rate even after the handover. In addition, the content of the present embodiment is also applicable to the terminal 200 according to the second embodiment.

(Sixth embodiment)

Figure 16:
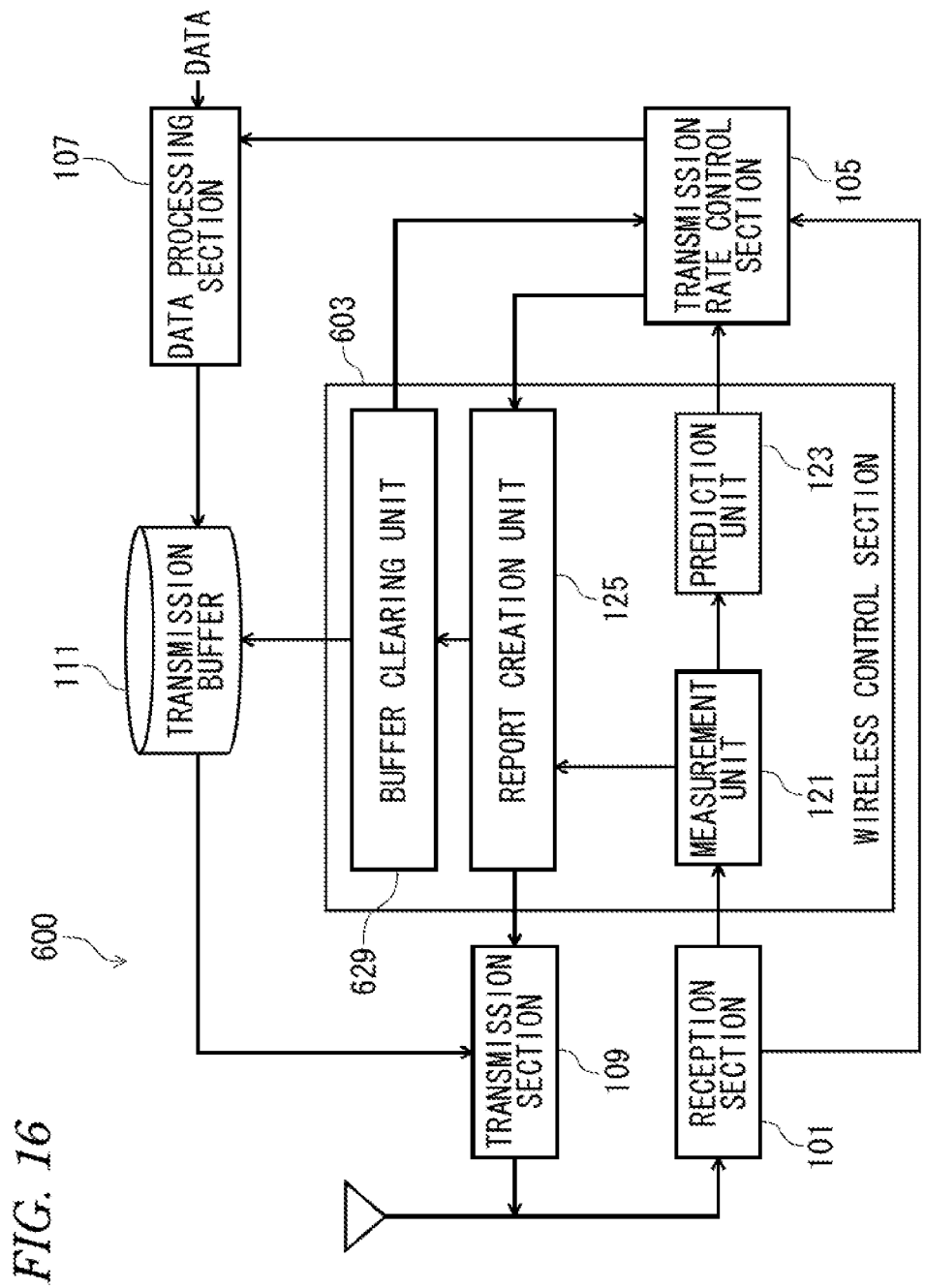
FIG. 16 is a block diagram illustrating an example of an internal configuration of a terminal according to a sixth embodiment.

FIG. 16 is a block diagram illustrating an example of an internal configuration of a terminal according to the sixth embodiment. There is a main difference between a terminal 600 according to the sixth embodiment and the terminal 100 according to the first embodiment in that a wireless control section 603 has a buffer clearing unit 629. The second embodiment is the same as the first embodiment except for this, and, in FIG. 16, the same reference numeral is given to a constituent element common to FIG. 1. In the following description, description of a part identical or equivalent to that of the first embodiment will be abridged or omitted.

The buffer clearing unit 629 of the wireless control section 603 according to the present embodiment discards (clears) transmission data preserved in the transmission buffer 111 when the report creation unit 125 creates a reception quality measurement result report (Measurement Report) before the wireless control section 603 receives a notification of transmission rate change completion. In addition, in a case where image data is preserved in the transmission buffer 111, the buffer clearing unit 629 clears the image data in the unit of a slice. In other words, in a case where block data which is less than one slice is left in the buffer, the buffer clearing unit 629 does not discard the data. Further, the buffer clearing unit 629 may discard only data packets preserved in the transmission buffer 111, and may not discard control packets. When clearing of the transmission buffer 111 is completed, the buffer clearing unit 629 notifies the transmission rate control section 105 of the fact.

When the notification of transmission rate change completion described in the second embodiment is received from the transmission rate control section 105, the report creation unit 125 of the wireless control section 603 according to the present embodiment creates the reception quality measurement result report with a handover request flag (Measurement Report with HO request flag) described in the second embodiment even if a measurement result report condition is not satisfied.

Figure 17:
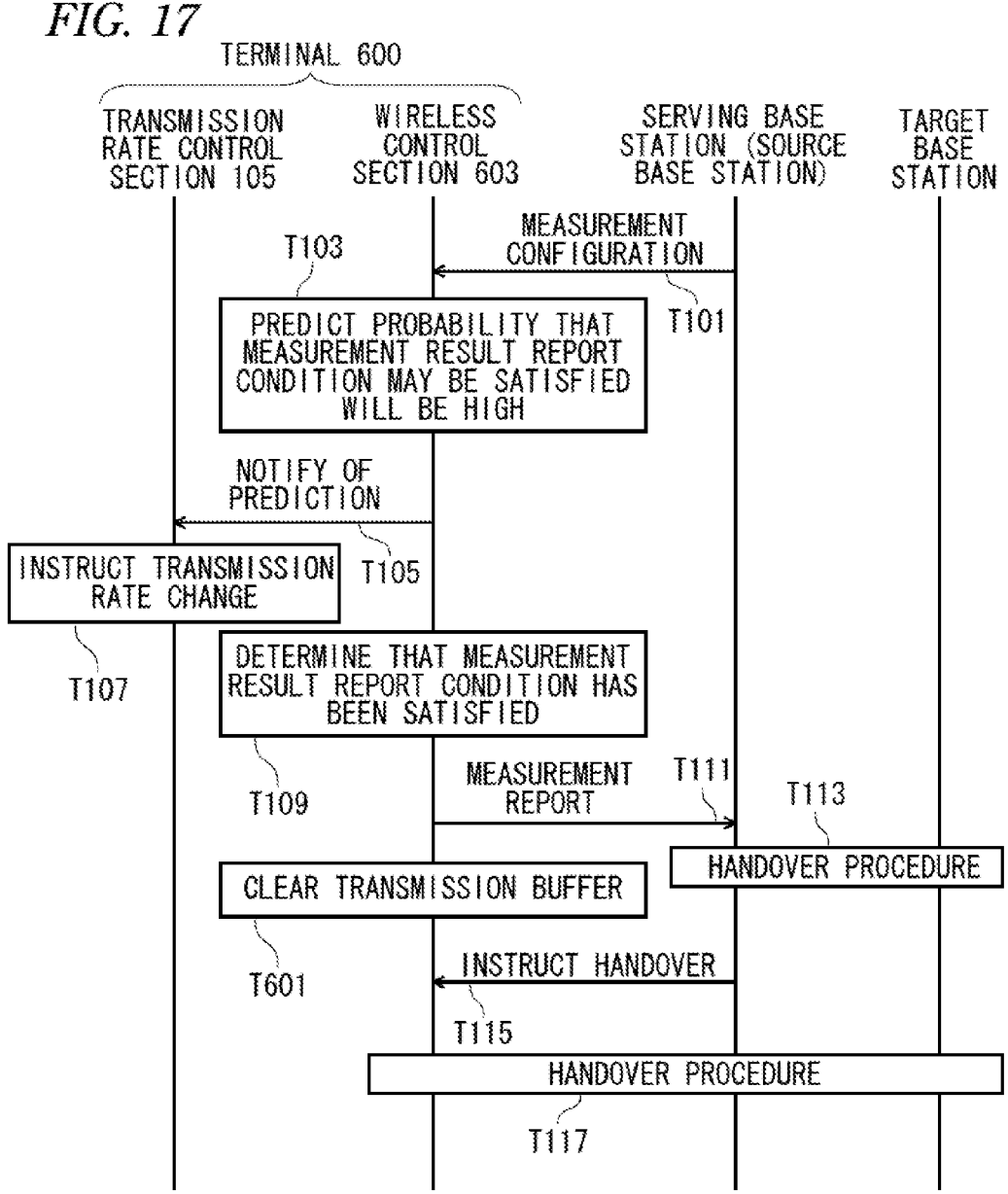
FIG. 17 is a sequence diagram illustrating an example of signaling between the terminal according to the sixth embodiment and a base station.

FIG. 17 is a sequence diagram illustrating an example of signaling between the terminal according to the sixth embodiment and a base station. In the following description, an operation of a part which is identical or equivalent to the sequence diagram of the first embodiment illustrated in FIG. 17 will be abridged or omitted. As illustrated in FIG. 17, in the wireless control section 603 of the terminal 600, if a notification of transmission rate change completion is not received from the transmission rate control section 105 in a stage in which the report creation unit 125 creates and transmits a reception quality measurement result report (Measurement Report) to the serving base station (T111), the buffer clearing unit 629 discards (clears) transmission data preserved in the transmission buffer 111 (T601).

Figure 18:
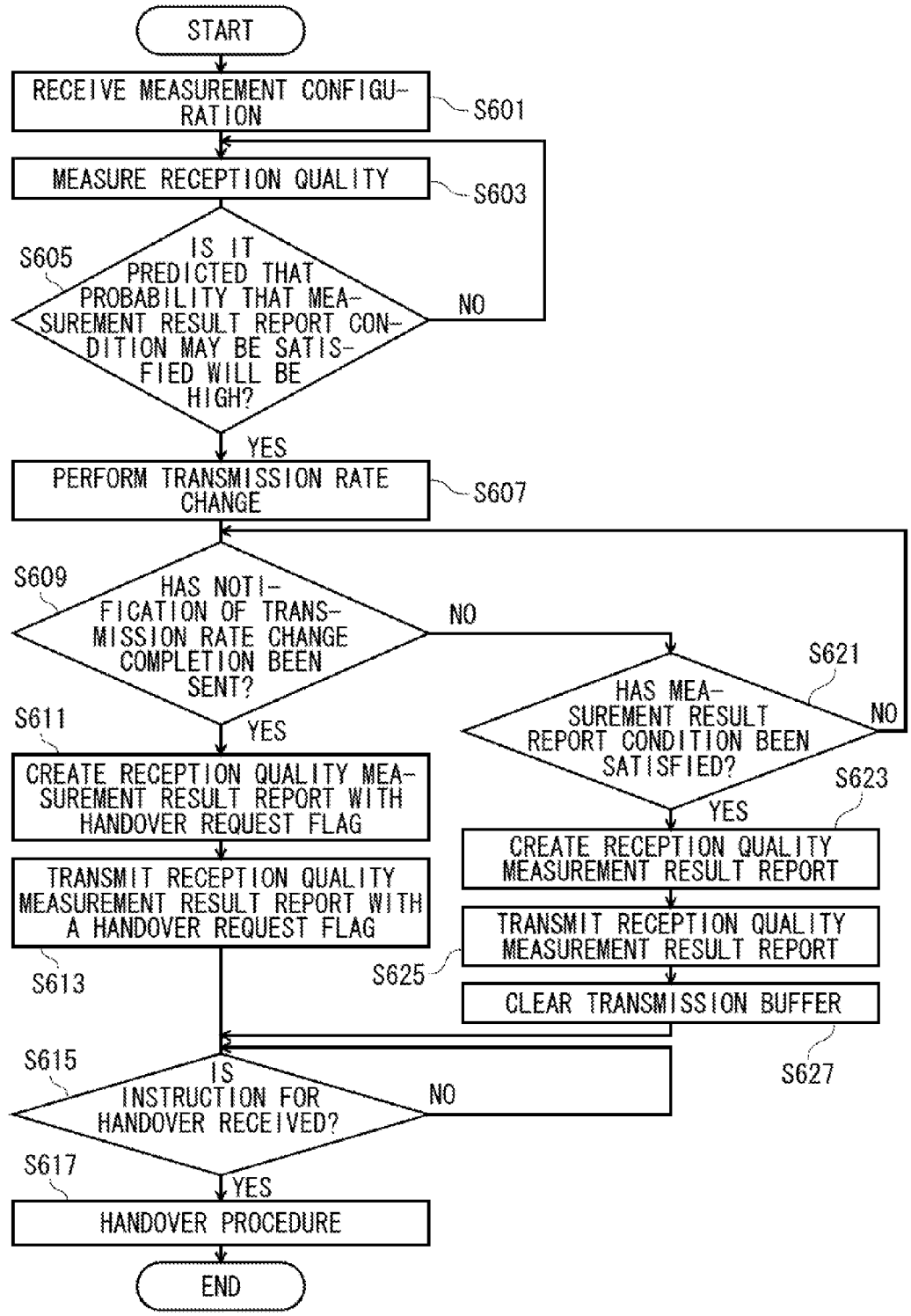
FIG. 18 is a flowchart illustrating an example of an operation of the terminal according to the sixth embodiment.
Figure 19:
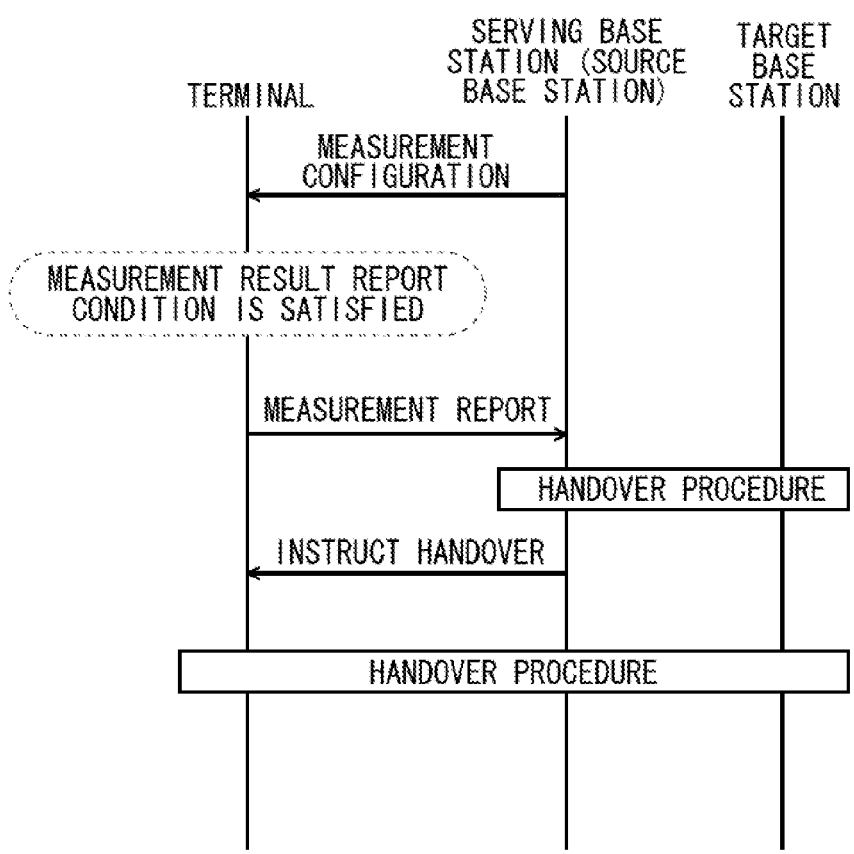
FIG. 19 is a timing chart illustrating procedures when an Inter-RAT handover occurs.

FIG. 18 is a flowchart illustrating an example of the operation of the terminal according to the sixth embodiment. As illustrated in FIG. 18, the reception section 101 receives a reception quality measurement configuration (Measurement Report) transmitted from the serving base station (step S601). The measurement unit 121 measures reception quality of respective signals from the serving base station and a base station providing a neighbor cell according to the reception quality measurement configuration (step S603). The prediction unit 123 determines whether or not a measurement result report condition will be satisfied within a specific time on the basis of the reception quality measured in step S603 (step S605). If it is predicted that a probability that the measurement result report condition may be satisfied will be high in step S605, the flow proceeds to step S607, and if it is predicted that a probability that the measurement result report condition may be satisfied will be low, the flow returns to step S603.

In step S607, the prediction unit 123 sends, to the transmission rate control section 105, a prediction notification that the measurement result report condition will be satisfied within a specific time, the transmission rate control section 105 instructs the data processing section 107 to process data at a transmission rate in a mobile communication system of the base station which is a handover destination, and the data processing section 107 performs a process of changing a transmission rate. Next, the wireless control section 603 determines whether or not a notification of transmission rate change completion has been received from the transmission rate control section 105 (step S609), and if the notification of transmission rate change completion has been received, the flow proceeds to step S611, and if the notification of transmission rate change completion has not been received, the flow proceeds to step S621.

In step S611, the report creation unit 125 creates a reception quality measurement result report with a handover request flag (Measurement Report with HO request flag) with a predetermined format based on the reception quality measurement configuration. Next, the transmission section 109 transmits the reception quality measurement result report with a handover request flag (Measurement Report with HO request flag) to the serving base station (step S613).

On the other hand, in step S621, the measurement unit 121 determines whether or not the measurement result report condition has been satisfied, and if it is determined that the measurement result report condition has been satisfied, the flow proceeds to step S623. In step S623, the report creation unit 125 creates a reception quality measurement result report (Measurement Report) with a predetermined format based on the reception quality measurement configuration. Next, the transmission section 109 transmits the reception quality measurement result report (Measurement Report) to the serving base station (step S625). Successively, the buffer clearing unit 629 clears transmission data preserved in the transmission buffer 111.

If step S613 or step S627 finishes, the flow proceeds to step S615. When the reception section 101 receives a handover instruction transmitted from the serving base station (Yes in step S615), the terminal 600 performs a handover procedure with a base station (target base station) which is a handover destination designated by the instruction (step S617), and is handed over to the target base station.

As described above, according to the present embodiment, in an Inter-RAT handover, it is possible to prevent the transmission buffer 111 from overflowing in a case where a transmission rate change is not completed before a handover is completed. In addition, it is possible to prevent communication interruption after a handover is completed, and thus it is possible to perform quick recovery from video irregularity.

Although a case where the present invention is configured in hardware has been described as an example in the respective embodiments, the present invention may be realized in software in association with hardware.

In addition, the respective function blocks used in the respective embodiments are typically realized by an LSI which is an integrated circuit. The function blocks may be realized using a single chip, or some or all of the function blocks may be realized using a single chip. Here, the LSI is mentioned, but may be referred to as an IC, a system LSI, a super LSI, or an ultra LSI depending on an integration degree difference.

In addition, a method of generating an integrated circuit is not limited to an LSI, and the function blocks may be realized by a dedicated circuit or a general purpose processor. After an LSI is manufactured, a Field Programmable Gate Array (FPGA) which can be programmed, or a reconfigurable processor which can reconfigure connection or setting of a circuit cell inside of the LSI may be used.

In addition, if a technique of generating an integrated circuit appears, which replaces an LSI, with the advance of a semiconductor technique or due to a separate technique, naturally, the function blocks may be integrated using the technique. A biotechnology or the like may be used.

In addition, the respective embodiments described above include disclosures of the following aspects.

<Disclosure 1 of Wireless Communication Terminal UE>

A mobile terminal which can be connected to a plurality of base stations with different mobile communication systems, including:

a measurement section configured to measure respective pieces of reception quality of a cell to which the mobile terminal is currently connected and a neighbor cell;

a transmission rate control section configured to change a transmission rate before a handover when the measurement section measures reduced reception quality; and a report creation section configured to create a measurement report when the reception quality satisfies a predetermined condition based on a threshold value set by a base station of the currently connected cell, and transmit the measurement report to the base station of the cell to which the mobile terminal is currently connected.

<Disclosure 2 of Wireless Communication Terminal UE>

The mobile terminal according to the disclosure 1, further including a prediction section configured to predict in advance that a probability that the reception quality satisfies the predetermined condition will be high, wherein the transmission rate control section changes a transmission rate when the prediction section predicts that a probability that the reception quality satisfies the predetermined condition will be high.

<Disclosure 3 of Wireless Communication Terminal UE>

The mobile terminal according to the disclosure 2, wherein the prediction section performs the prediction by using a value higher than a first threshold value for a measurement report of the currently connected cell, received from the base station of the currently connected cell.

<Disclosure 4 of Wireless Communication Terminal UE>

The mobile terminal according to the disclosure 3, wherein the prediction section performs the prediction by using a value lower than a second threshold value for a measurement report of the neighbor cell, received from the base station of the currently connected cell.

<Disclosure 5 of Wireless Communication Terminal UE>

The mobile terminal according to the disclosure 4, wherein the prediction section performs the prediction based on reception power of the currently connected cell and a difference and a change in reception power of the neighbor cell.

<Disclosure 6 of Wireless Communication Terminal UE>

The mobile terminal according to any one of the disclosures 3 to 5, further including a position information acquisition section configured to acquire position information of the mobile terminal, wherein the prediction section performs the prediction on the basis of the position information.

<Disclosure 7 of Wireless Communication Terminal UE>

The mobile terminal according to the disclosure 1, wherein the transmission rate change is performed when the measurement report is transmitted.

<Disclosure 8 of Wireless Communication Terminal UE>

The mobile terminal according to any one of the disclosures 1 to 7, wherein the transmission rate control section sends a notification of a transmission rate change to a counter terminal which communicates with the mobile terminal when a transmission rate is changed before the handover.

<Disclosure 9 of Wireless Communication Terminal UE>

The mobile terminal according to any one of the disclosures 1 to 8, further including:

a transmission buffer configured to temporarily preserve data transmitted by the mobile terminal; and a buffer clearing section configured to perform a process so as to discard data or some of the data preserved in the transmission buffer when the measurement report is transmitted before the transmission rate change is completed.

<Disclosure 10 of Wireless Communication Terminal UE>

The mobile terminal according to any one of the disclosures 1 to 9, wherein the transmission rate control section stops changing a transmission rate when the handover is a handover between cells with the same mobile communication system.

<Disclosure 11 of Wireless Communication Terminal UE>

The mobile terminal according to any one of disclosures 1 to 10, wherein the plurality of base stations with different mobile communication systems include a base station of an LTE scheme and a base station of a 3G scheme.

<Disclosure 1 of Rate Change Control Method>

A rate change control method performed by a mobile terminal which can be connected to a plurality of base stations with different mobile communication systems, including:

a measurement step of measuring respective pieces of reception quality of a cell to which the mobile terminal is currently connected and a neighbor cell;

a rate change step of changing a transmission rate before a handover when a reduction in the reception quality is measured; and a report step of creating a measurement report when the reception quality satisfies a predetermined condition based on a threshold value set by a base station of the currently connected cell, and transmits the measurement report to the base station of the cell to which the mobile terminal is currently connected.

<Disclosure 2 of Rate Change Control Method>

The rate change control method according to the disclosure 1, further including a prediction step of predicting in advance that a probability that the reception quality satisfies the predetermined condition will be high, wherein the rate change step is performed when it is predicted in the prediction step that a probability that the reception quality satisfies the predetermined condition will be high.

<Disclosure 3 of Rate Change Control Method>

The rate change control method according to the disclosure 2, wherein, in the prediction step, the prediction is performed by using a value higher than a first threshold value for a measurement report of the currently connected cell, received from the base station of the currently connected cell.

<Disclosure 4 of Rate Change Control Method>

The rate change control method according to the disclosure 3, wherein, in the prediction step, the prediction is performed by using a value lower than a second threshold value for a measurement report of the neighbor cell, received from the base station of the currently connected cell.

<Disclosure 5 of Rate Change Control Method>

The rate change control method according to the disclosure 4, wherein, in the prediction step, the prediction is performed based on reception power of the currently connected cell and a difference and a change in reception power of the neighbor cell.

<Disclosure 6 of Rate Change Control Method>

The rate change control method according to any one of the disclosures 3 to 5, further including a position information acquisition step of acquiring position information of the mobile terminal, wherein, in the prediction step, the prediction is performed on the basis of the position information.

<Disclosure 7 of Rate Change Control Method>

The rate change control method according to any one of the disclosures 1 to 3, wherein, in the rate change step, the transmission rate change is performed when the measurement report is transmitted.

<Disclosure 8 of Rate Change Control Method>

The rate change control method according to any one of the disclosures 1 to 7, wherein a notification of a transmission rate change is sent to a counter terminal which communicates with the mobile terminal when a transmission rate is changed before the handover in the rate change step.

<Disclosure 9 of Rate Change Control Method>

The rate change control method according to any one of the disclosures 1 to 8, wherein the mobile terminal includes a transmission buffer configured to temporarily preserve data transmitted by the mobile terminal, and wherein the rate change control method further includes a buffer clearing step of performing a process so as to discard data or some of the data preserved in the transmission buffer when the measurement report is transmitted before the transmission rate change is completed.

<Disclosure 10 of Rate Change Control Method>

The rate change control method according to any one of the disclosures 1 to 9, further including a step of stopping of changing a transmission rate when the handover is a handover between cells with the same mobile communication system.

<Disclosure 11 of Rate Change Control Method>

The rate change control method according to any one of disclosures 1 to 10, wherein the plurality of base stations with different mobile communication systems include a base station of an LTE scheme and a base station of a 3G scheme.

While the present invention has been described in detail, or with reference to the specific embodiments, it is apparent for those skilled in the art that the invention may be modified and changed in various manners without departing from the scope and spirit of the invention.

This invention is based on Japanese Patent Application (Japanese Patent Application No. 2011-189877) filed on Aug. 31, 2011, and Japanese Patent Application (Japanese Patent Application No. 2011-189878) filed on Aug. 31, 2011, the contents of which are incorporated herein by reference.

INDUSTRIAL APPLICABILITY

The mobile terminal related to the present invention is useful as a mobile terminal or the like performing stable data transmission when a handover is performed to a mobile communication system of which a transmission rate which can be used to transmit data is lower than a current transmission rate.

REFERENCE SIGNS LIST

100, 200, 300, 350, 500, and 600 Mobile terminal
101 Reception section
103, 203, and 603 Wireless control section
105, 205, 305, 355, and 505 Transmission rate control section
107 Data processing section
109 Transmission section
111 Transmission buffer
121 Measurement unit
123 Prediction unit
125 and 225 Report creation unit
227 Handover determination unit
629 Buffer clearing unit

The invention claimed is:

1. A mobile terminal which can be connected to a plurality of base stations with different mobile communication systems, comprising:
   a handover determination section configured to determine a handover execution between cells provided by the plurality of base stations;
   a transmission rate control section configured to change a transmission rate before a handover when the handover execution is determined; and
   a report creation section configured to create a quality measurement report including information regarding the handover after the transmission rate is changed, and transmit the quality measurement report to a base station of a cell to which the mobile terminal is currently connected,
   wherein the information regarding the handover is information for notifying the base station of the cell to which the mobile terminal is currently connected of a handover request, and
   wherein the transmission rate control section stops changing the transmission rate when the handover is a handover between cells with the same mobile communication system.

2. The mobile terminal according to claim 1, wherein the handover determination section determines the handover execution on the basis of an attribute of an application executed in the mobile terminal.

3. The mobile terminal according to claim 1, wherein the handover determination section determines the handover execution on the basis of comparison between a battery residual quantity of the mobile terminal and a predetermined value.

4. The mobile terminal according to claim 1, wherein the handover determination section determines the handover execution on the basis of measurement results of respective pieces of reception quality of a cell to which the mobile terminal is currently connected and an adjacent cell.

5. The mobile terminal according to claim 1, wherein the information regarding the handover further includes information for designating an adjacent cell which is a handover destination.

6. The mobile terminal according to claim 1, wherein the transmission rate control section sends a notification of a transmission rate change to a counter terminal which communicates with the mobile terminal when a transmission rate is changed before the handover.

7. The mobile terminal according to claim 1, further comprising:
   a transmission buffer configured to temporarily preserve data transmitted by the mobile terminal; and
   a buffer clearing section configured to perform a process so as to discard data or some of the data preserved in the transmission buffer when the quality measurement report is transmitted before the transmission rate change is completed.

8. The mobile terminal according to claim 1, wherein the plurality of base stations with different mobile communication systems include a base station of an LTE scheme and a base station of a 3G scheme.

9. A mobile terminal which can be connected to a plurality of base stations with different mobile communication systems, comprising:

a measurement section configured to measure respective pieces of reception quality of a cell to which the mobile terminal is currently connected and an adjacent cell;

a transmission rate control section configured to change a transmission rate before a handover when the measurement section measures reduced reception quality; and a report creation section configured to create a quality measurement report including information regarding the handover after the transmission rate is changed, and transmit the quality measurement report to a base station of the cell to which the mobile terminal is currently connected, wherein the information regarding the handover is information for notifying the base station of the cell to which the mobile terminal is currently connected of a handover request, and wherein the transmission rate control section stops changing the transmission rate when the handover is a handover between cells with the same mobile communication system.

10. The mobile terminal according to claim 9, further comprising a prediction section configured to predict in advance that the reception quality will satisfy a predetermined condition, wherein the transmission rate control section changes a transmission rate when the prediction section predicts that the reception quality will satisfy the predetermined condition.

11. A rate change control method performed by a mobile terminal which can be connected to a plurality of base stations with different mobile communication systems, comprising:

a handover determination step of determining a handover execution between cells provided by the plurality of base stations;

a rate change step of changing a transmission rate before a handover when the handover execution is determined;

a report step of creating a quality measurement report including information regarding the handover after the transmission rate is changed, and transmitting the quality measurement report to a base station of a cell to which the mobile terminal is currently connected, wherein the information regarding the handover is information for notifying the base station of the cell to which the mobile terminal is currently connected of a handover request; and a step of stopping the transmission rate change performed in the rate change step when the handover is a handover between cells with the same mobile communication system.

12. The rate change control method according to claim 11, wherein, in the handover determination step, the handover execution is determined on the basis of an attribute of an application executed in the mobile terminal.

13. The rate change control method according to claim 11, wherein, in the handover determination step, the handover execution is determined on the basis of comparison between a battery residual quantity of the mobile terminal and a predetermined value.

14. The rate change control method according to claim 11, wherein, in the handover determination step, the handover execution is determined on the basis of measurement results of respective pieces of reception quality of a cell to which the mobile terminal is currently connected and an adjacent cell.

15. The rate change control method according to claim 11, wherein the information regarding the handover further includes information for designating an adjacent cell which is a handover destination.

16. The rate change control method according to claim 11, further comprising a rate change notification step of sending a notification of a transmission rate change to a counter terminal which communicates with the mobile terminal when a transmission rate is changed before the handover in the rate change step.

17. The rate change control method according to claim 11, wherein the mobile terminal includes a transmission buffer configured to temporarily preserve data transmitted by the mobile terminal, and wherein the rate change control method further includes a buffer clearing step of performing a process so as to discard data or some of the data preserved in the transmission buffer when the quality measurement report is transmitted before the transmission rate change is completed.

18. The rate change control method according to claim 11, wherein the plurality of base stations with different mobile communication systems include a base station of an LTE scheme and a base station of a 3G scheme.

19. A rate change control method performed by a mobile terminal which can be connected to a plurality of base stations with different mobile communication systems, comprising:

a measurement step of measuring respective pieces of reception quality of a cell to which the mobile terminal is currently connected and an adjacent cell;

a rate change step of changing a transmission rate before a handover when a reduction in the reception quality is measured; and a report step of creating a quality measurement report including information regarding the handover after the transmission rate is changed, and transmitting the quality measurement report to the base station of the cell to which the mobile terminal is currently connected, wherein the information regarding the handover is information for notifying the base station of the cell to which the mobile terminal is currently connected of a handover request; and a step of stopping the transmission rate change performed in the rate change step when the handover is a handover between cells with the same mobile communication system.

20. The rate change control method according to claim 19, further comprising a prediction step of predicting in advance that the reception quality will satisfy a predetermined condition, wherein the rate change step is performed when it is predicted in the prediction step that the reception quality will satisfy the predetermined condition.

* * * * *